United States Patent
Sharp et al.

(10) Patent No.: US 6,790,136 B2
(45) Date of Patent: Sep. 14, 2004

(54) METHODS AND APPARATUS FOR RECIRCULATING AIR IN A CONTROLLED VENTILATED ENVIRONMENT

(75) Inventors: Gordon P. Sharp, Newton, MA (US); Eric M. Desrochers, Nashua, NH (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/619,765

(22) Filed: Jul. 15, 2003

(65) Prior Publication Data

US 2004/0005856 A1 Jan. 8, 2004

Related U.S. Application Data

(62) Division of application No. 09/735,063, filed on Dec. 11, 2000, now Pat. No. 6,609,967.

(51) Int. Cl.[7] ............................................. F24F 11/04
(52) U.S. Cl. ........................................ 454/229; 454/236
(58) Field of Search .......................... 454/56, 67, 229, 454/236; 236/44 C, 49.3; 165/211

(56) References Cited

U.S. PATENT DOCUMENTS

| | | |
|---|---|---|
| 2,144,693 A | 1/1939 | Seid |
| 2,907,178 A | 10/1959 | McNatt |
| 4,437,608 A | 3/1984 | Smith |
| 4,528,898 A | 7/1985 | Sharp et al. |
| 4,706,553 A | 11/1987 | Sharp et al. |
| 4,942,921 A | 7/1990 | Haessig et al. |
| 5,005,636 A | 4/1991 | Haessig |
| 5,292,280 A | 3/1994 | Janu et al. |
| 5,535,814 A | 7/1996 | Hartman |
| 5,544,697 A | 8/1996 | Clark |
| 5,605,280 A | 2/1997 | Hartman |
| 5,643,077 A | 7/1997 | Ayer |
| 5,707,005 A | * 1/1998 | Kettler et al. ............... 236/49.3 |
| 5,862,982 A | 1/1999 | Federspiel |
| 5,951,394 A | 9/1999 | Pariseau |
| 5,976,010 A | * 11/1999 | Reese et al. ................. 454/229 |
| 6,006,142 A | 12/1999 | Seem et al. |
| 6,161,764 A | 12/2000 | Jatnieks |

FOREIGN PATENT DOCUMENTS

WO WO/9409324 4/1994

\* cited by examiner

*Primary Examiner*—Harold Joyce

(57) ABSTRACT

Methods and apparatus for recirculating air in a controlled ventilated environment. In one example, recirculation of air from one or more rooms in a multiple room ventilated environment having a common source of supply air is controlled such that minimum ventilation and thermal load requirements for each room are satisfied independently, so as to facilitate a reduction in the amount of fresh outside air required for the environment. In another example, the controlled airflows in each room may be based additionally on respective air quality levels of the air drawn from each room. In one aspect, if contaminants are detected in one or more rooms of the ventilated environment, the amount of air recirculated from a contaminated room back to the environment may be controlled based on a detected level of the contaminant and a dilution ratio of any returned contaminated air to the total uncontaminated air supplied to the environment.

42 Claims, 14 Drawing Sheets

METHODS AND APPARATUS FOR RECIRCULATING AIR IN A CONTROLLED VENTILATED ENVIRONMENT

CROSS REFERENCE TO RELATED APPLICATION

The present application is a divisional of application Ser. No. 09/735,063, filed Dec. 11, 2000 Now U.S. Pat. No. 6,609,967.

FIELD OF THE INVENTION

The present invention is directed to ventilation of a closed environment, and more particularly, to methods and apparatus for controlling flows of air supplied to the environment and drawn from the environment to satisfy various ventilation requirements.

BACKGROUND OF THE INVENTION

Ventilation of a closed environment generally is considered as a process that involves drawing air from the environment and supplying air to the environment to make up for some or all of the air drawn from the environment. For some applications, ventilation may involve a dilution process in which the air supplied to a given environment includes a mixture of outside air (e.g., fresh air obtained exterior to the environment) and recycled air (e.g., air obtained from one or more rooms in the closed environment). Accordingly, in some ventilation applications, output air which is drawn from the environment may be divided into return air which is returned to the environment at some point and exhaust air which is exhausted from the environment to the outside.

In general, a flow of air that is drawn from or supplied to a closed environment by a ventilation system may be expressed as a volume of air per unit time, for example, in terms of cubic feet per minute (cfm). Ventilation standards established by the American Society of Heating, Refrigeration, and Air Conditioning Engineers (ASHRAE) provide some examples of guidelines for minimum acceptable ventilation system parameters in terms of the respective flows of air drawn from and supplied to a given environment. In particular, the ASHRAE standards establish guidelines for the flow of fresh outdoor air that should be supplied to an environment in a given time period to insure the safety and comfort of one or more persons occupying the environment from time to time.

For some ventilation applications, a variety of potentially harmful substances, or "contaminants," may be present in the environment to be ventilated. The potential presence of a variety of contaminants in an environment may in turn affect the desirability of recycling air (i.e., returning air drawn from the environment back to the environment) in the ventilation system.

One example of an environment in which a ventilation system may be employed is a laboratory. A laboratory generally is a facility that is designed to permit the safe use of various chemicals, toxic compounds and/or other potentially harmful substances for research or other purposes. The laboratory may be equipped with one or more devices or apparatus designed to exhaust air from the lab to an outside environment to protect lab users from potentially dangerous exposure to harmful substances. For example, a laboratory may include one or more exhaust devices such as laboratory fume hoods, canopy hoods, glove boxes, or biological safety cabinets, in which potentially harmful substances regularly may be handled, and/or exhaust trunks or "snorkels" which may be located exterior to hoods to exhaust air from a particular area (e.g., a bench top or analytical instrument) where potentially harmful substances occasionally may be handled. Additionally, a laboratory may include one or more exhausted storage cabinets to store potentially harmful substances and contain harmful fumes or vapors possibly emanating from such substances. In each of the foregoing laboratory exhaust apparatus (hereinafter referred to collectively as "auxiliary exhaust devices"), generally air is drawn from the laboratory environment and exhausted to the outside, and is not recirculated to the laboratory environment.

In view of the foregoing, conventional ventilation processes in a laboratory environment generally involve supplying 100% fresh outdoor air to the laboratory environment to make up for the air exhausted from the environment. In particular, in such processes, typically no air is recirculated from the laboratory environment back to the laboratory environment even though the air drawn from the lab environment often may be clean and safe. Furthermore, due to simplicity and costs, some portions of the lab environment served by the laboratory ventilation system, such as storage areas, office areas, "dry" laboratories (e.g., where generally no potentially harmful substances are handled), and the like, are also ventilated with 100% outside air, even though the possibility of contaminants being present in these areas is remote or nonexistent. Accordingly, the demand for 100% outside air in conventional laboratory ventilation systems often results in wasted resources (i.e., fresh outdoor air) and unnecessarily excessive operating costs.

With respect to ventilation systems in general, at least two guidelines may be considered in determining an appropriate flow of air supplied to (and drawn from) a given closed environment. One such guideline generally is referred to as a "minimum ventilation requirement," as alluded to briefly above in connection with the ASHRAE ventilation standards. The minimum ventilation requirement relates to a volume of fresh air that should be supplied to a given closed environment (or a particular portion thereof) in a given time period to establish a minimum level of dilution ventilation in the environment. Often, the minimum ventilation requirement is expressed in terms of "air changes per hour" (ACH), but may be alternatively expressed in terms of an airflow in cubic feet per minute (cfm). In particular, a minimum ventilation requirement given in units of ACH may be converted to an airflow in units of cfm by multiplying the minimum ventilation requirement by the volume of the environment and dividing this product by 60 minutes per hour. For example, for an environment having a volume of 1,000 cubic feet, a minimum ventilation requirement of 6 ACH may be given in terms of airflow in cfm by the following conversion:

(6 *ACH*×1000 cubic feet)/60 minutes per hour=100 *cfm*.

For purposes of the present disclosure, the term "minimum ventilation requirement" is used in a manner consistent with the description above.

Another guideline that may be considered in determining an appropriate flow of air supplied to (and drawn from) an environment in a ventilation system generally is referred to as a "thermal load requirement." In one aspect, the thermal load requirement for a given closed environment may relate to a flow of supply air (in cfm) having a particular temperature that is required to appropriately cool (or heat) the environment (or a particular portion thereof) to a desired temperature set point. In this aspect, the thermal load requirement not only depends on the temperature of the air supplied to the environment and the desired temperature set point, but typically is also a function of a "thermal load" which may be present in the environment. The term "thermal load" in this aspect generally refers to anything in the space, such as instrumentation or other apparatus (e.g., lab analysis equipment, computer equipment, etc.) which may generate heat in the environment (or a particular portion thereof). Such thermal loads generally may be collectively characterized in terms of the number of Watts per square foot that all of the loads generate in the space.

In another aspect, the thermal load requirement for a given closed environment may relate to a flow of supply air (in cfm) having a particular moisture content that is required to appropriately humidify (or dehumidify) the environment (or a particular portion thereof) to a desired humidity. Based on the foregoing, it should be appreciated that more generally, the thermal load requirement may relate to a flow of supply air having a particular moisture content and/or a particular temperature so as to condition the environment in terms of one or both of temperature and humidity. For purposes of the present disclosure, the term "thermal load requirement" is used in a manner consistent with the foregoing description.

While a detailed explanation of the derivation of the thermal load requirement for an environment may be somewhat complicated and unnecessary for purposes of the present discussion, one useful approximation for deriving a thermal load requirement under certain conditions particularly related to temperature (as opposed to humidity) is provided here as an illustrative example. In this example, it is assumed that a heat generating thermal load of 10 Watts per square foot (e.g., expected to be generated by equipment, lights, and people) is present in a closed environment having an approximately nine foot ceiling, and that relatively cool air having a temperature of approximately 55° F. is supplied to the environment to maintain a desired temperature set point of approximately 70° F. Under these conditions, the environment has a thermal load requirement (in this particular case, a thermal load cooling requirement) of approximately 1.5 cubic feet per minute (cfm) of supply airflow per square foot of the environment. Accordingly, in this example, an actual thermal load requirement for the environment may be obtained by using the foregoing relationship (i.e., 1.5 cfm/ft$^2$) and multiplying by the area of the environment in square feet to obtain the thermal load requirement in units of cfm.

In conventional ventilation systems that consider both the minimum ventilation requirement and the thermal load requirement for an environment, typically the greater of the minimum ventilation requirement and the thermal load requirement determines the flow of air supplied to the environment (and hence the flow of air drawn from the environment). In environments such as the laboratory described above, which may include one or more auxiliary exhaust devices that exhaust air from the environment to the outside, the amount of supply air required to make up for such exhaust air may in some cases satisfy (or even exceed) the greater of the minimum ventilation requirement and the thermal load requirement.

For example, laboratory exhaust hoods generally have minimum airflow requirements to exhaust potentially harmful substances that may be handled by lab personnel in the hood. In some cases, especially in lab environments with more than one auxiliary exhaust device, a sum of such minimum exhaust airflow requirements for each exhaust device may more than satisfy the greater of the minimum ventilation requirement and the thermal load requirement for the environment. Hence, in this situation, the greatest of the minimum exhaust airflow requirement from one or more auxiliary exhaust devices, the minimum ventilation requirement, and the thermal load requirement generally determines the required flow of air supplied to the environment.

In some ventilated environments, however, the thermal load requirement may be significantly greater than the minimum ventilation requirement (and the minimum exhaust airflow requirement if one or more auxiliary exhaust devices are present). This condition is in part due to the steady increase over recent years in the amount of analytical and computer equipment that is being used, for example, in various laboratories, office spaces, and the like. For example, thermal loads of 10 to 20 Watts per square foot are becoming commonplace in many ventilated environments. The result is that the thermal load requirement increasingly has become the dominant guideline that determines airflow requirements in some ventilation systems.

The trend of increased thermal load requirements for ventilated environments poses particular challenges in designing an efficient ventilation system that can be built and operated at reasonable costs. In particular, in laboratory environments in which typically no air is recirculated and 100% fresh outdoor air is supplied to the environment, increasing the thermal load requirement beyond that of either the minimum ventilation requirement or the minimum exhaust airflow requirement of any auxiliary exhaust devices present in the environment exacerbates the problem of potentially wasted resources (i.e., fresh supply air) and, hence, may lead to unnecessarily excessive operating costs.

SUMMARY OF THE INVENTION

One embodiment of the invention is directed to a method for ventilating at least a first room of a plurality of rooms in a ventilated environment, wherein the plurality of rooms are ventilated by a common source of supply air. The method comprises an act of independently satisfying a minimum ventilation requirement and a thermal load requirement for at least the first room.

In one aspect of this embodiment, the act of independently satisfying a minimum ventilation requirement and a thermal load requirement for at least the first room includes acts of drawing output air from the first room, controlling a return air flow of a first part of the output air that is returned to the ventilated environment as return air, and controlling an exhaust air flow of a second part of the output air that is exhausted from the ventilated environment as exhaust air, wherein the return air flow and the exhaust air flow are controlled such that the minimum ventilation requirement and the thermal load requirement for at least the first room are satisfied independently.

Another embodiment of the invention is directed to a computer readable medium encoded with at least one program for execution on at least one processor associated with a ventilated environment. The ventilated environment includes a plurality of rooms that are ventilated by a common source of supply air. The at least one program, when executed on the at least one processor, performs a method for ventilating at least a first room of the plurality of rooms, wherein the method comprises an act of independently satisfying a minimum ventilation requirement and a thermal load requirement for at least the first room.

Another embodiment of the invention is directed to a controller to control ventilation of at least a first room of a plurality of rooms in a ventilated environment in which the plurality of rooms are ventilated by a common source of supply air. The controller controls the ventilation of at least the first room such that a minimum ventilation requirement and a thermal load requirement for at least the first room are satisfied independently.

In one aspect of this embodiment, the ventilated environment includes at least one return air flow device that controls a return air flow of a first part of output air that is drawn from the first room and returned to the ventilated environment as return air, and at least one exhaust air flow device that controls an exhaust air flow of a second part of the output air that is drawn from the first room and exhausted from the ventilated environment as exhaust air. In this aspect, the controller controls at least the at least one return air flow device and the at least one exhaust air flow device such that the minimum ventilation requirement and the thermal load requirement for at least the first room are satisfied independently.

Another embodiment of the invention is directed to a ventilation system to ventilate at least a first room of a plurality of rooms in a ventilated environment in which the plurality of rooms are ventilated by a common source of supply air. The ventilation system comprises at least one return air flow device disposed in a path of output air drawn from the first room to vary a return air flow of at least a first portion of the output air, wherein the first portion of the output air constitutes at least a portion of return air that is returned to the ventilated environment. The ventilation system also comprises at least one exhaust air flow device in the path of the output air drawn from the first room to vary an exhaust air flow of at least a second portion of the output air, wherein the second portion of the output air is exhausted from the ventilated environment as exhaust air. The ventilation system further comprises at least one controller to control at least the at least one return air flow device and the at least one exhaust air flow device such that a minimum ventilation requirement and a thermal load requirement for at least the first room are satisfied independently.

Another embodiment of the invention is directed to a method of controlling a level of at least one contaminant present in a common source of supply air that is provided in a ventilated environment including at least a first room and a second room. The first room has drawn therefrom first return air that constitutes a first portion of air returned to the ventilated environment as at least some of the supply air. The second room has drawn therefrom second return air that constitutes a second portion of the air returned to the ventilated environment as at least some of the supply air. The method comprises an act of independently controlling at least one of a first flow of the first return air and a second flow of the second return air based at least on a detected presence of the at least one contaminant in at least one of the first room and the second room.

In one aspect of this embodiment, the act of independently controlling at least one of a first flow of the first return air and a second flow of the second return air includes acts of determining a threshold limit for the detected presence of the at least one contaminant in at least one of the first room and the second room based at least on a dilution ratio of at least one of the first flow of the first return air and the second flow of the second return air to a total uncontaminated air flow, and independently controlling at least one of the first flow of the first return air and the second flow of the second return air based at least on the threshold limit for the detected presence of the at least one contaminant.

In another aspect of this embodiment, the act of independently controlling at least one of the first flow of the first return air and the second flow of the second return air based at least on the threshold limit for the detected presence of the at least one contaminant includes an act of reducing at least one of the first flow of the first return air and the second flow of the second return air if the detected presence of the at least one contaminant in at least one of the first room and the second room exceeds the threshold limit.

In yet another aspect of this embodiment, the act of independently controlling at least one of the first flow of the first return air and the second flow of the second return air based at least on the threshold limit for the detected presence of the at least one contaminant includes an act of reducing a flow of the supply air to at least one of the first room and the second room if the detected presence of the at least one contaminant in at least one of the first room and the second room exceeds the threshold limit.

In yet another aspect of this embodiment, the act of independently controlling at least one of the first flow of the first return air and the second flow of the second return air based at least on the threshold limit for the detected presence of the at least one contaminant includes an act of increasing a flow of exhaust air that is drawn from at least one of the first room and the second room and not returned to the ventilated environment if the detected presence of the at least one contaminant in at least one of the first room and the second room exceeds the threshold limit.

Another embodiment of the invention is directed to a computer readable medium encoded with at least one program for execution on at least one processor associated with a ventilated environment including at least a first room and a second room ventilated by a common source of supply air. The first room has drawn therefrom first return air that constitutes a first portion of air returned to the ventilated environment as at least some of the supply air. The second room has drawn therefrom second return air that constitutes a second portion of the air returned to the ventilated environment as at least some of the supply air. The at least one program, when executed on the at least one processor, performs a method of controlling a level of at least one contaminant present in the supply air, wherein the method comprises an act of independently controlling at least one of a first flow of the first return air and a second flow of the second return air based at least on a detected presence of the at least one contaminant in at least one of the first room and the second room.

Another embodiment of the invention is directed to a controller to control a level of at least one contaminant present in a common source of supply air for a ventilated environment that includes at least a first room and a second room supplied by the supply air. The first room has drawn therefrom first return air that constitutes a first portion of air returned to the ventilated environment as at least some of the supply air. The second room has drawn therefrom second return air that constitutes a second portion of the air returned to the ventilated environment as at least some of the supply air. The controller independently controls at least one of a first flow of the first return air and a second flow of the second return air based at least on a detected presence of the at least one contaminant in at least one of the first room and the second room.

BRIEF DESCRIPTION OF THE DRAWINGS

The drawings are not intended to be drawn to scale. In the drawings, like elements have been given like reference characters.

DETAILED DESCRIPTION

Figure 1:
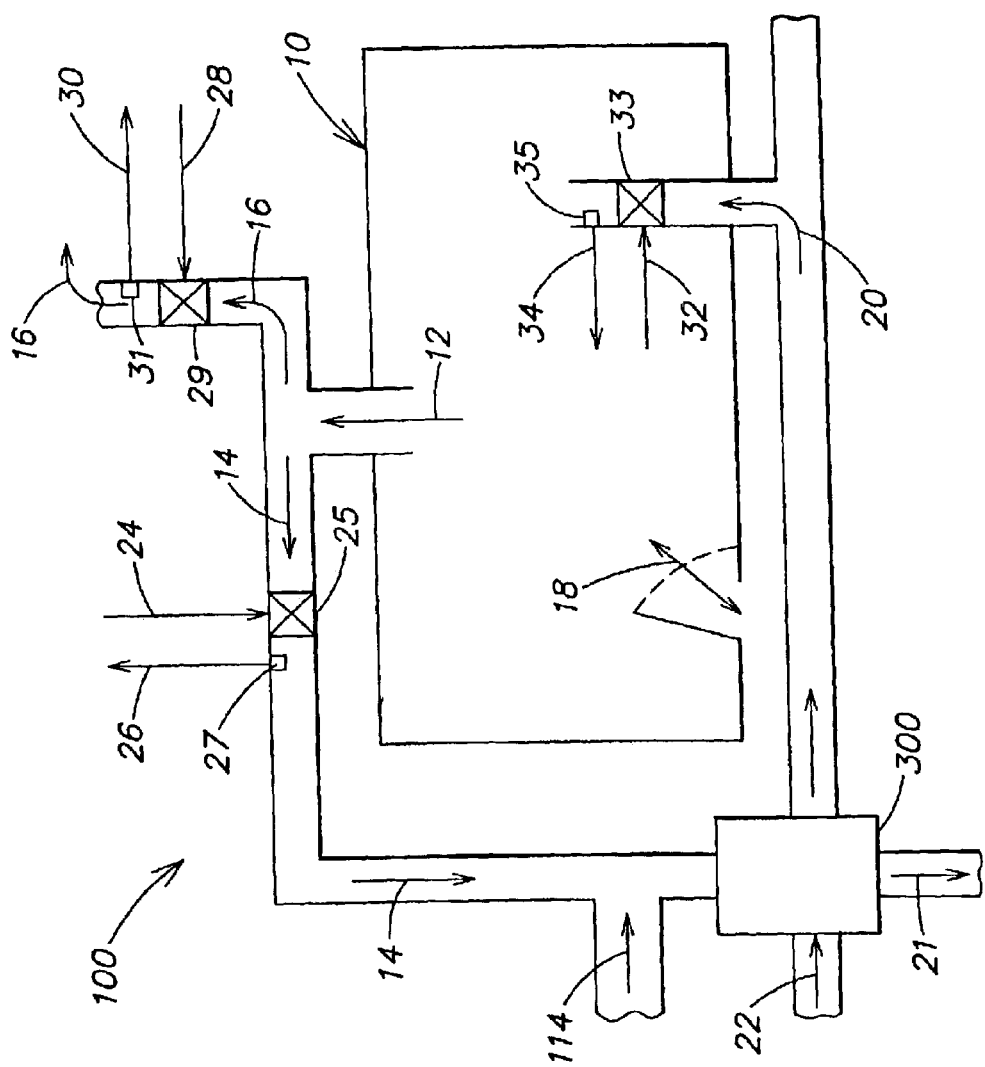
FIG. 1 is a diagram showing a portion of a ventilation system according to one embodiment of the invention.

As discussed above, conventional ventilation systems that consider both a minimum ventilation requirement and a thermal load requirement for a closed environment generally control a flow of air supplied to the environment (and a flow of air drawn from the environment) based on the greatest of the minimum ventilation requirement, the thermal load requirement, and a minimum exhaust airflow requirement for the environment (if the environment is equipped with one or more auxiliary exhaust devices). In some cases, the thermal load requirement for the environment may be appreciably greater than the other ventilation requirements, due to the presence of a significant thermal load in the environment (e.g., various heat-generating or heat-absorbing equipment).

Applicants have appreciated that, although it may be necessary to provide "fresh" (100% outside) supply air to the environment in order to satisfy minimum ventilation and/or minimum auxiliary exhaust airflow requirements; generally it is not necessary, however, to supply 100% fresh air to the environment to satisfy the thermal load requirement for the environment. Accordingly, Applicants have recognized that the approach of some conventional ventilation systems may supply more fresh air than is necessary to satisfy the minimum ventilation and auxiliary exhaust airflow requirements if the thermal load requirement is the dominating ventilation guideline. Such an approach generally results in unnecessary wasted resources and increased operating costs.

In particular, Applicants have recognized that the thermal load requirement for an environment may be satisfied independently of either the minimum ventilation requirement or the minimum auxiliary exhaust airflow requirement for the environment by recirculating some of the air drawn from the environment instead of exhausting all of the air drawn from the environment. Accordingly, one embodiment of the present invention is directed to methods and apparatus for recirculating air in a controlled ventilated environment so as to independently satisfy respective thermal load and minimum ventilation requirements.

For example, one embodiment of the invention is directed to ventilation of a single room in a multiple room ventilated environment (also referred to herein as a "controlled" environment), wherein one or more air handling units provide a common source of supply air to two or more rooms of the controlled environment. Additionally, in one aspect of this embodiment, some portion of air drawn from each room in the controlled environment may be combined at some point and returned to the one or more air handling units. According to this embodiment of the invention, a first part of output air that is drawn from a room is returned to the air handling unit as return air, and a second part of the output air that is drawn from the room is exhausted as exhaust air. A return airflow of the return air and an exhaust airflow of the exhaust air are controlled such that the minimum ventilation requirement for the room and the thermal load requirement for the room are satisfied independently.

In another aspect of this embodiment, the exhaust airflow is controlled essentially independently of the thermal load requirement. In particular, in this aspect, the exhaust airflow is controlled so as to satisfy only the greater of the minimum ventilation requirement and a minimum auxiliary exhaust airflow requirement (if auxiliary exhaust devices are present). In contrast, the return airflow is controlled independently of the exhaust airflow so as to satisfy the thermal load requirement, if this requirement is greater than each of the minimum ventilation requirement and the minimum auxiliary exhaust airflow requirement. By recirculating some of the output air drawn from the room and controlling the flow of the recirculated return air to satisfy the thermal load requirement independently of other ventilation requirements, methods and apparatus of the invention in various embodiments reduce the amount of required fresh outside air that is supplied to the room (and, hence, to the ventilated environment as a whole), thereby facilitating greater conservation of resources (fresh air), increased efficiency, and cost savings.

In another embodiment of the invention, a ventilated environment includes one or more laboratory rooms, and may include additional rooms that are generally associated with a laboratory environment, wherein two or more of the laboratory rooms and any additional rooms receive a common source of supply air from one or more air handling units. In particular, one or more laboratory rooms of such an environment may include one or more auxiliary exhaust devices (e.g., exhaust or fume hoods, bio-safety cabinets canopies, "snorkels," storage cabinets) for handling or storing potentially harmful substances. In contrast, one or more other "support" rooms of the environment (e.g., offices, computer labs, storage rooms) may not be equipped to handle or store potentially harmful substances, as it is unlikely that these rooms would be exposed to significant levels of potentially harmful substances.

In the above embodiment related to a multi-room ventilated laboratory environment, air drawn from each laboratory room or support room in the environment may be sensed (i.e., sampled) for the presence of contaminants. If it is determined that the air in a particular room is clean enough to be recirculated to the environment, then at least a portion of the output air drawn from that room is returned to the environment (e.g., via the one or more air handling units) rather than being exhausted. If, on the other hand, the output air drawn from a particular room is found to be contaminated (or perhaps offensive due to undesirable but not particularly harmful odors), then the air drawn from that room is individually exhausted. In this manner, air from each individual room in the environment can be returned to the environment or exhausted based at least on the instantaneous quality of the room air.

In one aspect of the multi-room laboratory embodiment discussed above, one or more rooms in the environment is equipped with at least one return airflow device. Similarly, one or more rooms of the environment may be equipped with at least one general exhaust airflow device and/or one or more optional auxiliary exhaust airflow devices. It should be appreciated that, in this aspect of the multi-room laboratory embodiment discussed above, return and exhaust airflows associated with any room that is equipped with both a return airflow device and at least one exhaust airflow device may be controlled so as to independently satisfy that room's particular thermal load requirement and minimum ventilation requirement. In this manner, a multi-room ventilation system according to one embodiment of the invention may satisfy a number of potentially unique thermal load requirements and minimum ventilation requirements respectively associated with a number of rooms in a ventilated environment by controlling the airflows associated with each room independently of one another.

Following below are more detailed descriptions of various concepts related to, and embodiments of, methods and apparatus according to the present invention for recirculating air in a controlled ventilated environment. It should be appreciated that various aspects of the invention, as discussed above and outlined further below, may be implemented in any of numerous ways, as the invention is not limited to any particular manner of implementation. Examples of specific implementations are provided for illustrative purposes only.

FIG. 1 is a diagram showing a portion of a ventilation system 100 for a single room 10 of a multiple room ventilated environment, according to one embodiment of the invention. As shown in FIG. 1, one or more air handling units 300 provide a common source of supply air 20 to the room 10 as well as one or more other rooms (not shown in FIG. 1) of the ventilated environment. The air handling unit 300 receives outside air 22, and may also receive return air 14 from the room 10 as well as return air 114 from one or more other rooms of the ventilated environment.

During more temperate times of the year (e.g., spring and fall), in some ventilation applications it may be more economical to exhaust all or a portion of the return air 14 and 114 to the outside and replace this air with outside (i.e., fresh) air 22 rather than recirculate the returned air (sometimes referred to as "free cooling"). In these instances, the air handling unit 300 may be constructed and arranged with a general exhaust outlet to permit a flow of aggregate exhaust air 21 to the outside, and the air handling unit would then increase the flow of outside air 22 by the flow of aggregate exhaust air 21. In one embodiment, the flow of the aggregate exhaust air 21 may be particularly adjusted to increase the flow of outside air 22 so as to achieve a greater dilution of the return air 14 and 114, as discussed further below.

According to one embodiment, FIG. 1 shows that a first part of output air 12 may be drawn from the room 10 as the return air 14, and a second part of the output air 12 may be exhausted from the room 10 as exhaust air 16. FIG. 1 also shows offset air 18, which may flow into or out of the room 10 via a door or a transfer grill, for example.

Figure 2:
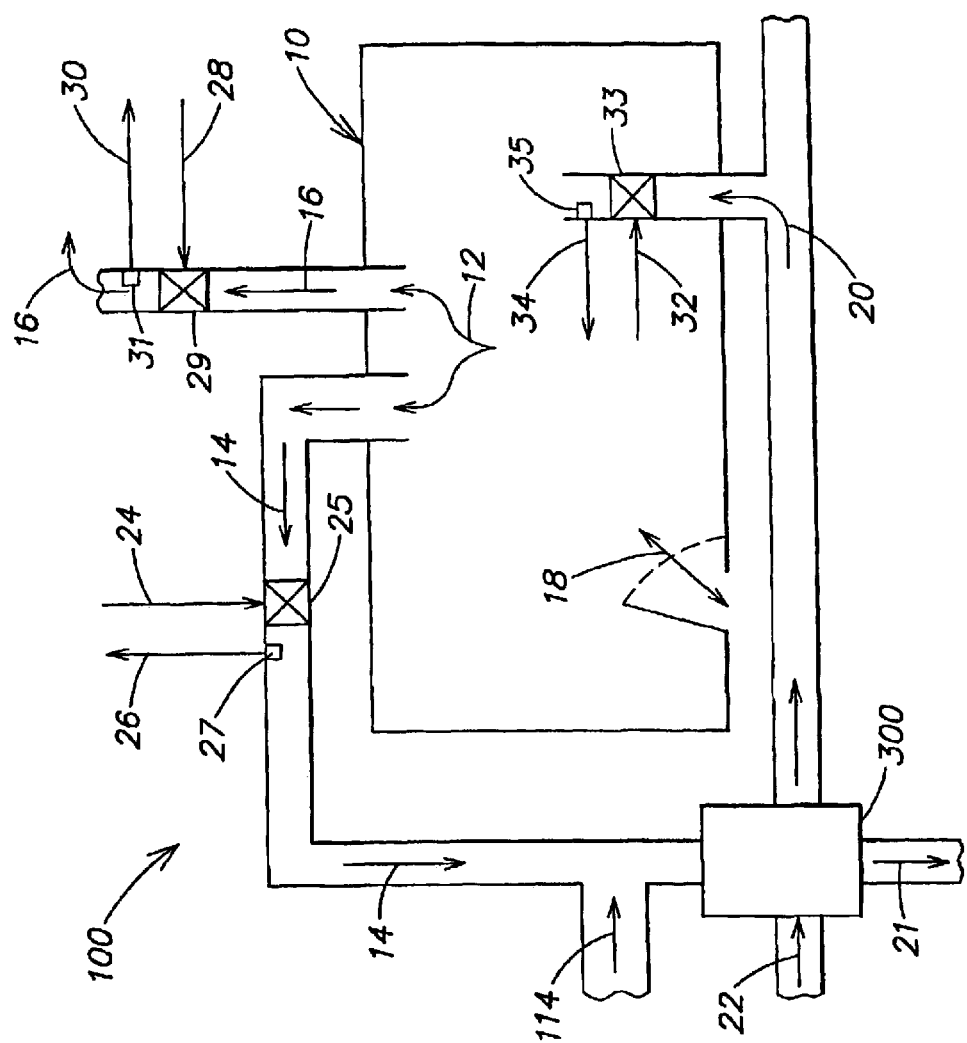
FIG. 2 is a diagram showing a portion of a ventilation system according to another embodiment of the invention.

While FIG. 1 shows that the output air 12 is drawn from the room 10 via a single duct, FIG. 2 shows an alternate configuration for the ventilation system 100 of FIG. 1, in which the output air 12 is drawn from the room via two separate ducts, one duct for the return air 14, and another duct for the exhaust air 16. In other respects, however, the ventilation systems shown in FIGS. 1 and 2 are similar. The single duct configuration shown in FIG. 1 may in some cases facilitate sensing the quality of the output air drawn from the room, as discussed further below in connection with FIG. 7. However, it should be appreciated that both of the duct configurations shown in FIGS. 1 and 2 may be suitable for purposes of the invention in various embodiments.

As shown in FIGS. 1 and 2, the ventilation system 100 includes at least one return airflow device 25, which receives a return airflow command 24. The system 100 also includes at least one exhaust airflow device 29 which receives an exhaust airflow command 28, and a supply airflow device 33 which receives a supply airflow command 32. Examples of airflow devices suitable for purposes of the invention include, but are not limited to, variable speed fans or blowers, controllable dampers, valves or boxes (e.g., constant volume or variable air volume boxes), and the like.

FIGS. 1 and 2 also show that the ventilation system 100 may include a return airflow measuring device 27 that outputs a return airflow signal 26, an exhaust airflow measuring device 31 that outputs an exhaust airflow signal 30, and a supply airflow measuring device 35 that outputs a supply airflow signal 34. A variety of airflow measuring devices may be suitable for purposes of the invention. Examples of such devices include, but are not limited to, velocity pressure measurement devices, thermal anemometers, and orifice meters using static pressure drops to measure airflow.

In one embodiment of the ventilation system 100 shown in FIGS. 1 and 2, any one or all of the return airflow device 25, the exhaust airflow device 29, and the supply airflow device 33 may be a venturi-type valve. A venturi-type valve typically is capable of both controlling airflow based on a received command, and outputting a calibrated airflow signal. For example, in one aspect of this embodiment, a venturi-type valve used for the return airflow device 25 both receives the return airflow command 24 and outputs the return airflow signal 26; hence, for embodiments in which any of the airflow devices 25, 29, and 33 are venturi-type valves, the associated airflow measuring devices 27, 31, and 35 may not be necessary.

A venturi-type valve generally is shaped so as to have a converging inlet portion and a diverging outlet portion which form a "throat" at a junction of the converging and diverging portions. Inside the valve, a cone and spring assembly are attached to a shaft having a controllable position which moves along an axis through the center of the valve body, along the direction of flow. The cone typically is positioned adjacent to the throat of the body so as to create a ring-shaped orifice. When air flows through a venturi-type valve, the cone converts a pressure drop across the ring-shaped orifice into a force which is applied to the spring. The spring then moves to maintain a constant flow rate for a given shaft position, independent of pressure drops across the valve. Accordingly, the shaft position represents a particular airflow through the valve. Hence, a flow command may be applied to the venturi-type valve to actuate the shaft so as to position the cone, and an indication of the resulting shaft position may be calibrated and provided by the valve as a calibrated airflow signal.

Figure 2A:
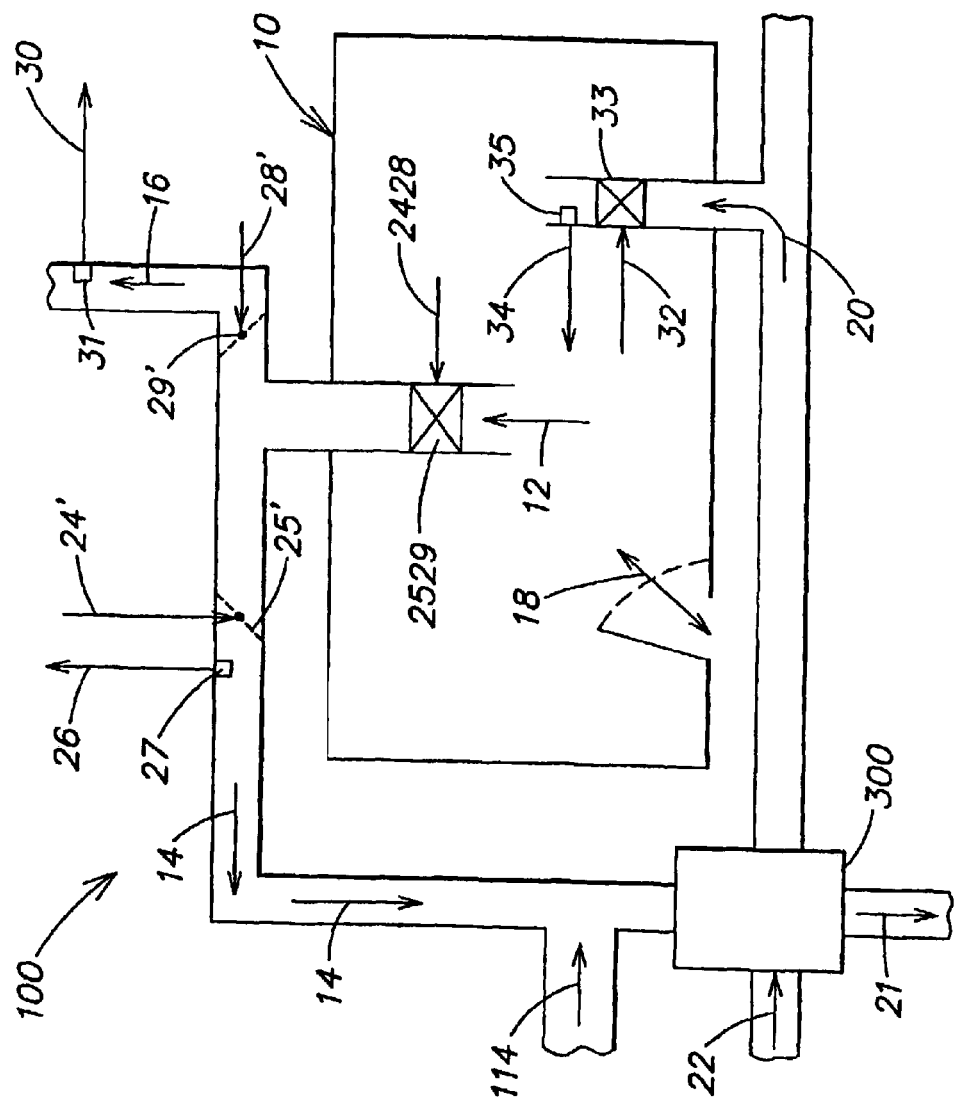
FIG. 2A is a diagram showing a portion of a ventilation system according to yet another embodiment of the invention.

FIG. 2A is a diagram showing another embodiment of the ventilation system 100. In the embodiment of FIG. 2A, the return airflow device 25 and the exhaust airflow device 29 of FIGS. 1 and 2 are alternatively shown as a return damper 25' and an exhaust damper 29', respectively. The return damper 25' receives a return airflow command 24' which operates the damper 25' to divert a portion of the output air as return air 14. Similarly, the exhaust damper 29' receives an exhaust airflow command 28' which operates the damper 29' to divert a portion of the output air as exhaust air 16.

While FIG. 2A shows respective return and exhaust dampers 25' and 29', it should be appreciated that, alternatively, a single damper may be employed to divert the output air 12 between return air and exhaust air in various proportions, or more than two dampers may be employed to accomplish such a diversion. Additionally, FIG. 2A shows that the ventilation system 100 of this embodiment may include an output airflow device 2529 that receives an output airflow command 2428. It should also be appreciated that since the return airflow, the exhaust airflow, and the output airflow are proportional to one another, the commands 24', 28', and 2428 shown in FIG. 2A may be derived from the commands 24 and 28 shown in FIGS. 1 and 2, as discussed further below in connection with FIG. 3.

The system of FIG. 2A may be particularly suitable for applications in which, under normal operating conditions, the output air is diverted either 100% to return air or 100% to exhaust air. For example, the system shown in FIG. 2A may be suitable for situations in which output air drawn from the room normally is returned to the air handling unit 300, but in the event of a high contaminant presence or other environmental hazard (e.g., smoke, fire) the output air is diverted as exhaust air.

Figure 3:
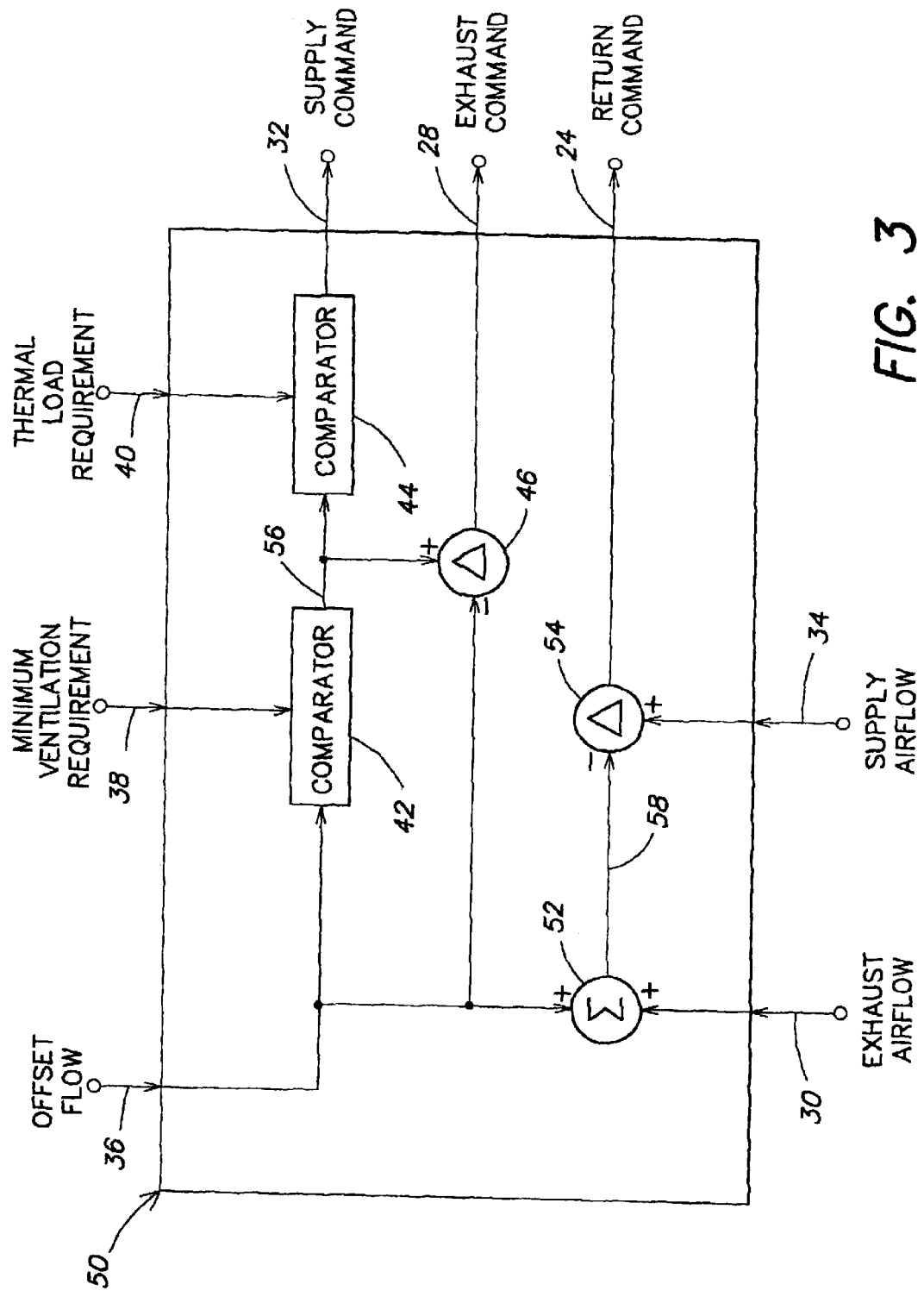
FIG. 3 is a diagram showing a controller for use with the ventilation system shown in FIGS. 1; 2, or 2A, according to one embodiment of the invention.

FIG. 3 is a diagram showing a controller 50 that may be employed to monitor the various airflow signals and to generate the various airflow control commands in the ventilation system 100 illustrated in FIGS. 1, 2 and 2A, according to one embodiment of the invention. In particular, the controller 50 of FIG. 3 typically controls one or more return airflow devices, one or more exhaust airflow devices, and one or more supply airflow devices that may be present in the ventilation system, based on at least some of the monitored airflow signals, and a minimum ventilation requirement for the room 10 and/or a thermal load requirement for the room 10.

For purposes of illustration, the controller 50 shown in FIG. 3 is configured to control one return airflow device, one exhaust airflow device, and one supply airflow device. However, it should be appreciated that a ventilation system according to various embodiments of the invention may not require all of the aforementioned airflow devices in a particular room, may require more than one of a particular airflow device, and/or may employ other alternative airflow devices (e.g., the output airflow device 2529 and the dampers 25' and 29' of FIG. 2A). Hence, various controllers according to other embodiments of the invention, as discussed further below, may be configured somewhat differently than the controller shown in FIG. 3. Nevertheless, several of the concepts discussed below in connection with the controller of FIG. 3 generally apply to controllers according to other embodiments of the invention.

Additionally, for purposes of the following discussion, input and output parameters associated with various controllers according to the invention are considered in terms of airflows in cubic feet per minute (cfm). It should be appreciated, however, that the invention is not limited in this respect, and that other convenient and/or suitable units of measure may be used to describe input and output parameters of controllers according to various embodiments of the invention.

As shown in the embodiment of FIG. 3, the controller 50 receives as inputs a minimum ventilation requirement 38 and a thermal load requirement 40 as "set points" (e.g., in units of cfm). In this embodiment, the controller 50 outputs the return airflow command 24, the exhaust airflow command 28, and the supply airflow command 32 to the respective airflow devices shown in FIGS. 1 and 2, based on the minimum ventilation requirement 38 and the thermal load requirement 40 (in another embodiment, the commands 25', 29', and 2529 of the ventilation system shown in FIG. 2A may be derived from one or more of the commands 24, 28, and 32, as discussed further below). FIG. 3 also shows that, in one embodiment, the controller 50 also receives as inputs the exhaust airflow signal 30 and the supply airflow signal 34 from the airflow measuring devices 31 and 35, respectively, shown in FIGS. 1, 2, and 2A. Alternatively, as discussed above, the airflow signals 30 and 34 may be obtained from venturi-type valves serving as the exhaust and supply airflow devices shown in FIGS. 1 and 2.

Additionally, FIG. 3 shows that the controller 50 also may receive as an input an offset flow 36 as an additional "set point" that determines the flow of offset air 18 (shown in FIGS. 1, 2, and 2A), either into or out of the room 10. The offset flow set point 36 generally represents a net difference between the flow of supply air to the room and the flow of output air drawn from the room, and may be selected such that the room 10 has a net negative pressure (i.e., the offset air 18 flows into the room when a door is opened), or a net positive pressure (i.e., the offset air 18 flows out of the room 10 when a door is opened). Alternatively, in one aspect of this embodiment, the offset flow set point 36 may be set to zero, such that the sum of the flow of return air 14 and the flow of exhaust air 16 is essentially equal to the flow of supply air 20 for the room 10. For purposes of the present discussion, a positive value (e.g., in cfm) of the offset flow set point 36 represents a flow of offset air 18 out of the room 10. It should be appreciated, however, that this convention is for purposes of illustration only, and that other conventions for the direction of flow of the offset air 18 may be used in other embodiments of the invention.

In sum, the input parameters to the controller 50 shown in FIG. 3 include the offset flow set point 36, the minimum ventilation requirement 38, the thermal load requirement 40, and the supply and exhaust airflows 34 and 30, respectively. The output parameters of the controller 50 shown in FIG. 3 include the return, exhaust, and supply airflow commands 24, 28, and 32, respectively.

According to one aspect of the embodiment shown in FIG. 3, the controller 50 provides the airflow commands 24, 28, and 32 to various airflow devices shown in FIGS. 1, 2, and 2A so as to independently satisfy the minimum ventilation requirement 38 and the thermal load requirement 40 for the room 10. As discussed above, for purposes of the present disclosure, the minimum ventilation requirement 38 refers to the minimum level of dilution ventilation required for the room 10 in terms of how much fresh outside air must be supplied to the room in a given time period. Likewise, for purposes of the present disclosure, the thermal load requirement 40 refers to the flow of supply air having a particular temperature and/or moisture content which is required to achieve a desired temperature and/or humidity set point for the room 10.

While the minimum ventilation requirement relates to a supply of at least some fresh outdoor air to the room 10, in contrast the thermal load requirement does not necessarily require that the air supplied to the room be fresh outdoor air; rather, the thermal load requirement is based primarily on an expected temperature and/or humidity of the supply air, the thermal load in the room, and the desired temperature and/or humidity for the room. Accordingly, in one aspect, the controller 50 of FIG. 3 controls the exhaust airflow essentially independently of the thermal load requirement; hence, the fresh outdoor air portion of the supply air that is used to make up for exhaust air does not depend on the thermal load requirement.

FIG. 3 shows that, according to one embodiment, the controller 50 includes a first comparator 42 to compare the offset flow set point 36 to the minimum ventilation requirement 38. An output 56 of the first comparator 42 represents the greater of the minimum ventilation requirement 38 and the offset flow set point 36. The output 56 is provided to a subtracter 46 (e.g., an inverting adder), which subtracts the offset flow set point 36 from the output 56 to provide the exhaust airflow command 28. In this manner, the controller 50 derives the exhaust airflow command 28 independently of the thermal load requirement 40. In particular, if, for example, the offset flow set point 36 is set to 0 cfm, the exhaust airflow command 28 is based only on the minimum ventilation requirement 38.

In the controller 50 of FIG. 3, the output 56 of the first comparator 42 is also provided to a second comparator 44. The second comparator 44 compares the thermal load requirement 40 to the output 56, and provides the greater of these two as the supply airflow command 32. Accordingly, the supply airflow command 32 represents the greatest of the thermal load requirement 40, the minimum ventilation requirement 38, and the offset flow set point 36.

The controller 50 of FIG. 3 derives the return airflow command 24 from the supply airflow 34 and the exhaust airflow 30, which are regulated by the supply and exhaust airflow devices based on the supply and exhaust airflow commands 32 and 28, respectively. In particular, the controller 50 of FIG. 3 includes an adder 52 which adds the exhaust airflow 30 to the offset flow set point 36 to generate a summed exhaust flow 58.

It is again noted here that for purposes of the present discussion, a positive offset flow set point 36 represents offset air 18 that leaves the room 10 from, for example, a door. Accordingly, using the foregoing convention, the offset flow set point 36 may be added to (rather than subtracted from) the exhaust airflow 30 to obtain the summed exhaust flow 58. However, it should be appreciated that the foregoing example is for purposes of illustration only, and that the invention is not so limited; namely, the offset flow set point 36 may be implemented in the controller 50 in numerous ways, based in part on the sign convention employed for describing the flow of the offset air 18 shown in FIGS. 1, 2, and 2A.

To derive the return airflow command 24, the controller 50 of FIG. 3 includes a second subtracter 54 (e.g., an inverting adder) which subtracts the summed exhaust flow 58 from the supply airflow 34 to provide the return airflow command 24. Since the supply airflow 34 may depend on either the minimum ventilation requirement 38 or the thermal load requirement 40, it should be appreciated in the controller of FIG. 3 that the return airflow command 24 may likewise depend on either the minimum ventilation requirement 38 or the thermal load requirement 40. In contrast, however, as discussed above, the exhaust airflow command 28 output by the controller 50 of FIG. 3 depends on the minimum ventilation requirement 38, and not on the thermal load requirement 40.

With reference again to FIG. 2A, in one embodiment, the controller 50 of FIG. 3 may be adapted to control the ventilation system 100 shown in FIG. 2A. In particular, it should be appreciated that since the flows of return air 14, exhaust air 16, and output air 12 are proportional to each other, the return damper command 24', the exhaust damper command 28' and the output airflow command 2428 shown in FIG. 2A may be appropriately derived, for example, from the return airflow command 24 and the exhaust airflow command 28 output by the controller 50 of FIG. 3. For example, the controller 50 may be adapted such that the commands 24, 28, and 32 (shown as controller outputs in FIG. 3) are further processed by a processor and/or other circuitry (not shown in FIG. 3) to derive the commands 24', 28', and 2428 shown in FIG. 2A, based on appropriate mathematical relationships.

Figure 3A:
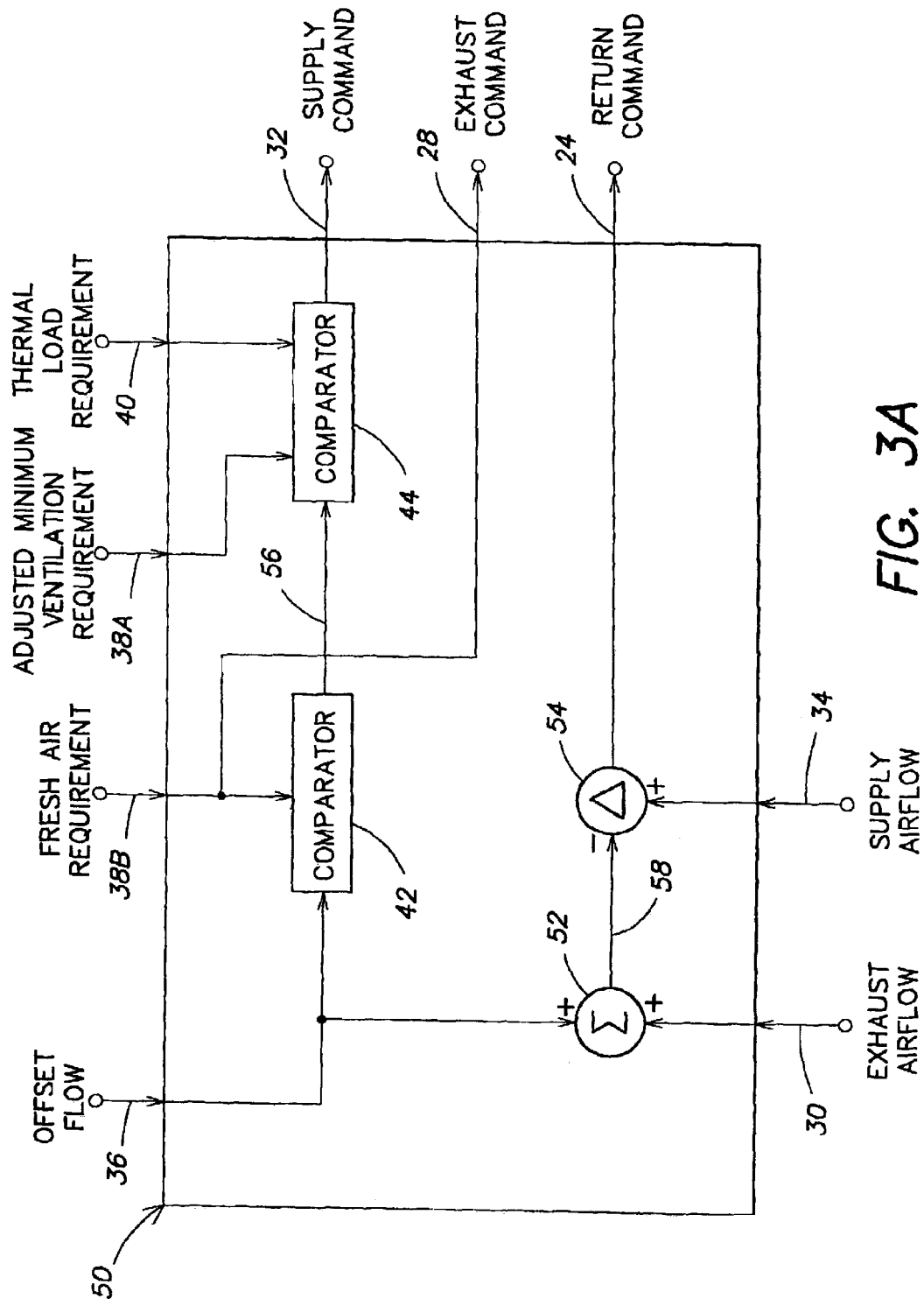
FIG. 3A is a diagram showing a controller according to another embodiment of the invention.

FIG. 3A is a diagram of a controller 50 similar to the controller shown in FIG. 3, according to another embodiment of the invention. In particular, in the embodiment of FIG. 3A, the controller 50 receives as inputs an adjusted minimum ventilation requirement 38A and a fresh air requirement 38B, rather than a minimum ventilation requirement 38 (e.g., as shown in FIG. 3). The adjusted minimum ventilation requirement 38A represents an alternative definition of the minimum ventilation requirement 38, which depends in part on the particular ventilation needs for the room 10.

For example, as discussed above, the minimum ventilation requirement 38 may be viewed as representing the minimum volume of exhaust air to be exhausted from a room in a given time period, wherein the volume of exhaust air is replaced by fresh outside air. However, in the embodiment of FIG. 3A, the adjusted minimum ventilation requirement 38A represents a minimum volume of output air to be drawn from the room within a given time period, wherein the output air may include both return air and exhaust air. Stated differently, the adjusted minimum ventilation requirement 38A represents a total volume of air supplied to the room in a given time period, including both fresh and recirculated (i.e., return) air, as opposed to merely fresh air.

Conceptually, the adjusted minimum ventilation requirement may be viewed as the minimum flow of air into the room which is diluting any contaminants that might be present in the room. Accordingly, the adjusted minimum ventilation requirement 38A relates to both the supply air 20 (including fresh and recirculated air) and any offset air 18 that may flow into the room. By considering both the return air and fresh outside air as contributing to the dilution of potential contaminants in the room, the actual amount of fresh outside air required to satisfy the adjusted minimum ventilation requirement is reduced.

In view of the foregoing, in the embodiment of FIG. 3A, the fresh air requirement 38B represents the minimum volume of air to be exhausted from the room and replaced with fresh outside air (i.e., similar to the minimum ventilation requirement 38 in the embodiment of FIG. 3), while the adjusted minimum ventilation requirement 38A represents a minimum volume of supply air (including both fresh outside air and return air) supplied to the room in a given time period. For example, in the embodiment of FIG. 3A, a fresh air requirement of two air changes per hour (2 ACH) may be selected to represent the minimum exhaust airflow requirement, whereas an adjusted minimum ventilation requirement of six air changes per hour (6 ACH) may be selected to represent the minimum supply airflow requirement.

In view of the foregoing, in the embodiment of FIG. 3A, the comparator 44 of the controller 50 provides the supply airflow signal 32 based on the greatest of the thermal load requirement 40, the adjusted minimum ventilation requirement 38A, and the output 56 of the first comparator 42 (which represents the greater of the offset flow set point 36 and the fresh air requirement 38B). Furthermore, since the fresh air requirement 38B is directly related to the air exhausted from the room out of the building, it is used to directly provide the exhaust command 28. It should be appreciated that the concept of a fresh air requirement 38B and an adjusted minimum ventilation requirement 38A, as an alternative to the minimum ventilation requirement 38 shown in FIG. 3, may be implemented in any of the controllers 50 discussed further below, according to other embodiments of the invention. In particular, according to one embodiment, the fresh air requirement 38B may be adjusted based on various occupied and unoccupied states of the closed environment, or based on a flow of exhaust air from auxiliary exhaust devices such as fume hoods (discussed further below in connection with FIGS. 5 and 6A).

Figure 4:
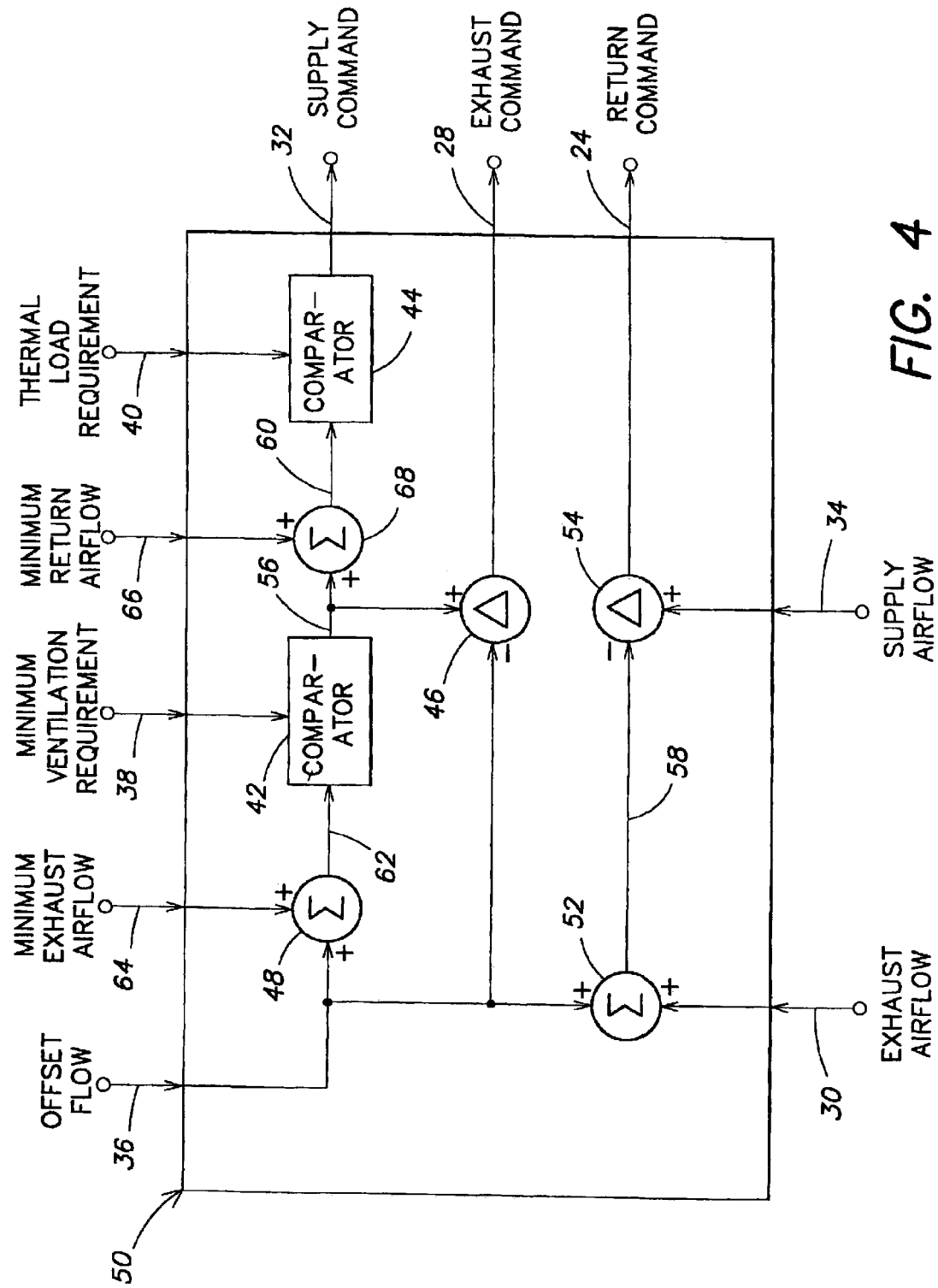
FIG. 4 is a diagram showing a controller according to yet another embodiment of the invention.

FIG. 4 is a diagram showing a controller 50 similar to the controller shown in FIGS. 3 and 3A, according to yet another embodiment of the invention. The controller 50 of FIG. 4 may be particularly suitable for applications of the ventilation system 100 (e.g., shown in FIGS. 1 and 2) in which some minimum flow of return air 14 and exhaust air 16 is expected to be present in the system. In one respect, this is a favorable condition in a ventilation system, as generally it becomes increasingly difficult to sense airflow as airflow approaches zero. Additionally, when using venturi-type valves for airflow control devices, generally it is desirable to operate with some minimum flow through the valve. Accordingly, the controller 50 of FIG. 4 may be particularly suitable for use in ventilation systems according to the invention that employ one or more venturi-type valves as airflow control devices, or other types of airflow control devices which utilize some type of airflow measurement mechanism that may not sense very small airflows accurately.

The controller 50 of FIG. 4 differs from the controllers of FIGS. 3 and 3A in that two additional input parameters, or operating set points, are provided to the controller; namely, a minimum exhaust airflow 64 and a minimum return airflow 66. In the controller 50 of FIG. 4, a first adder 48 adds the offset flow set point 36 and the minimum exhaust airflow 64 to provide a first summed flow 62. The first comparator 42 compares the first summed flow 62 to the minimum ventilation requirement 38, and provides the greater of these two as the output 56. As in FIG. 3, the output 56 is provided to the subtracter 46, which in turn provides the exhaust airflow command 28 based on a difference between the output 56 and the offset flow set point 36.

In the controller 50 shown in FIG. 4, a second adder 68 adds the output 56 to the minimum return airflow 66 to provide a second summed flow 60. The comparator 44 compares the second summed flow 60 to the thermal load requirement 40, and outputs the greater of these two as the supply airflow command 32. In FIG. 4, as in FIG. 3, the controller 50 outputs the return airflow command 24 based on a difference between the supply airflow 34 and a sum of the exhaust airflow 30 and the offset flow set point 36.

Accordingly, the return airflow command 24 may be based on either the minimum ventilation requirement 38 or the thermal load requirement 40 (by virtue of the supply airflow 34), while the exhaust airflow command 28 may be based on the minimum ventilation requirement 38, but not the thermal load requirement 40.

Figure 4A:
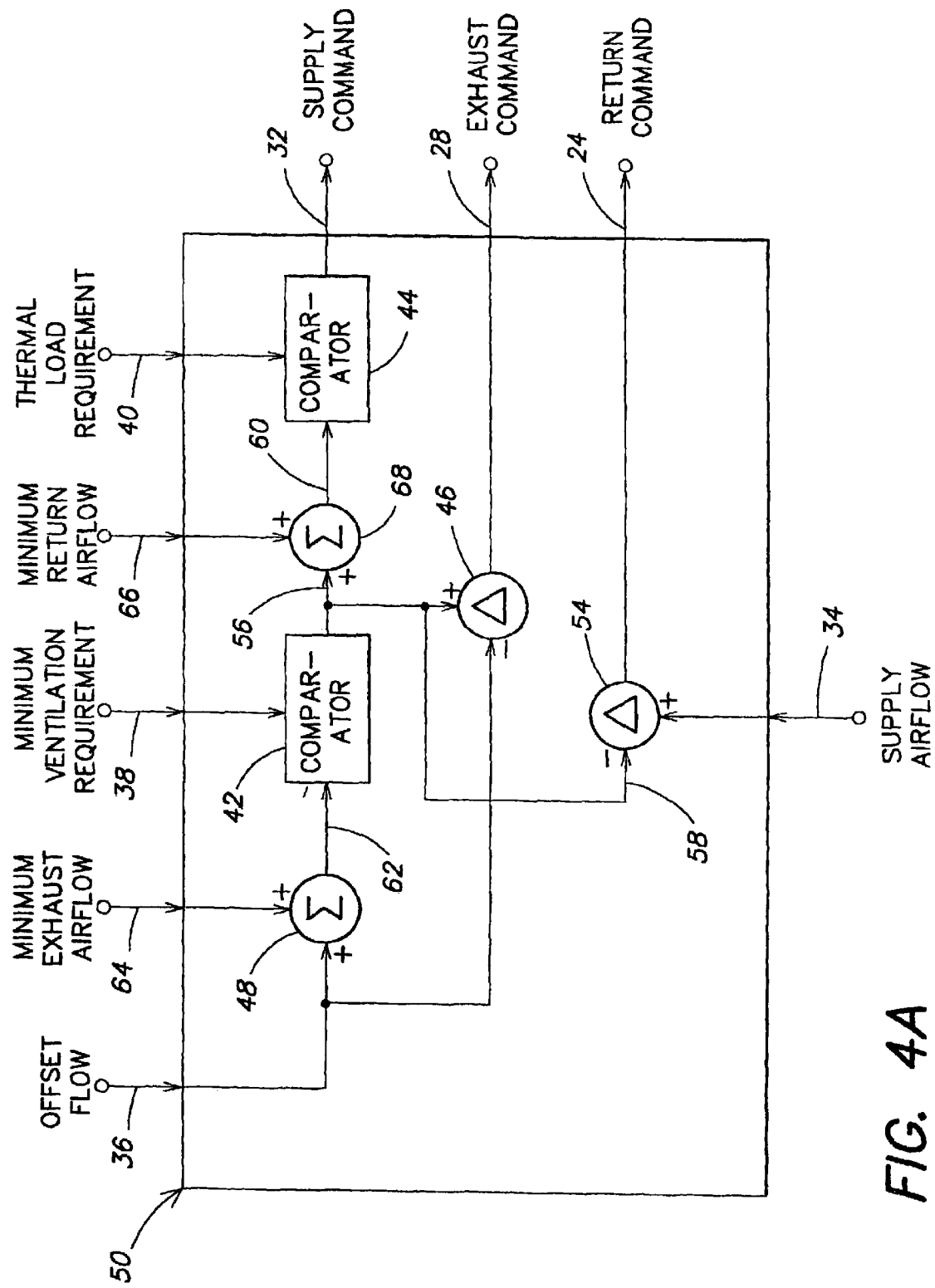
FIG. 4A is a diagram showing a controller according to yet another embodiment of the invention.

FIG. 4A is a diagram of a controller 50 similar to the controller shown in FIG. 4, according to yet another embodiment of the invention. In FIG. 4A, the adder 52 and exhaust airflow 30 shown in connection with the controller of FIG. 4 are eliminated, and the input 58 of the subtracter 54 is connected to the signal 56 output by the comparator 42. The controller of this embodiment may be appropriate for situations in which obtaining an accurate measure of airflow from the exhaust airflow control device may be difficult.

Figure 5:
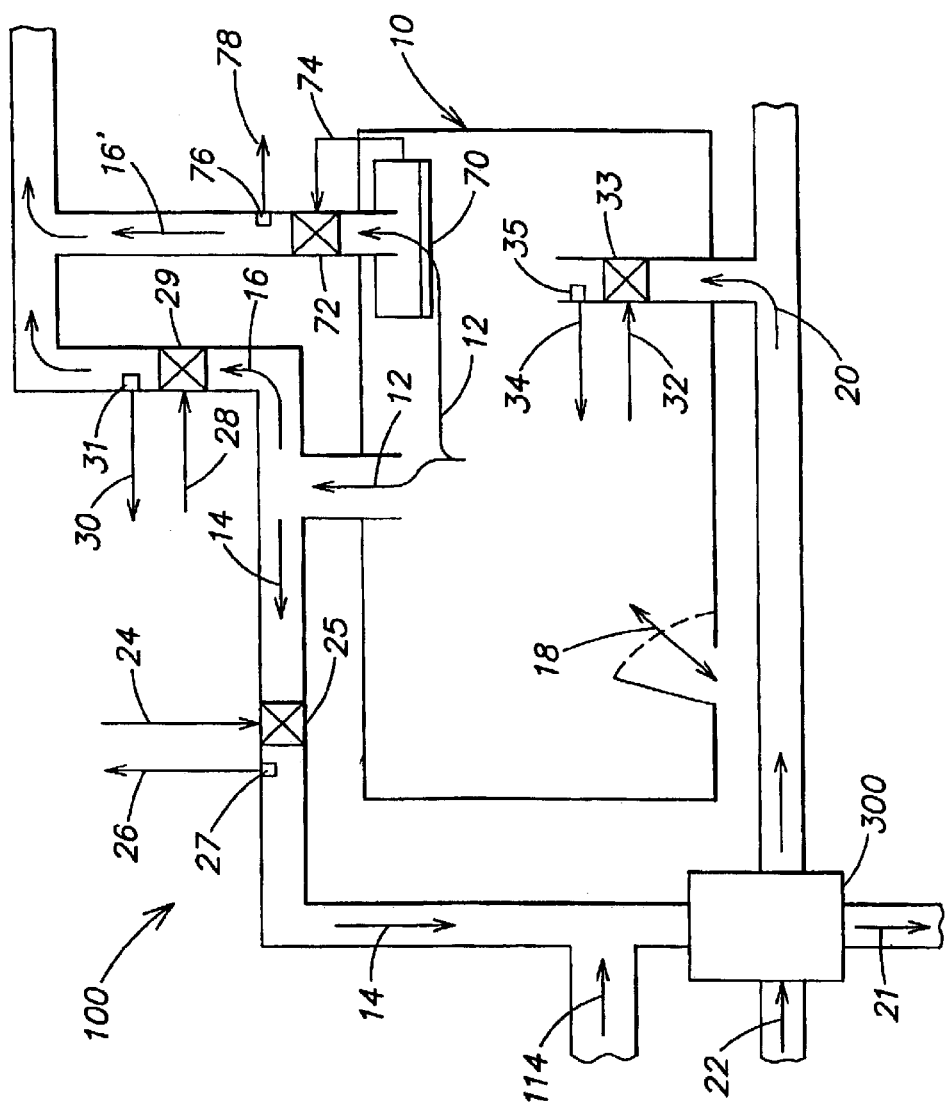
FIG. 5 is a diagram showing a ventilation system according to yet another embodiment of the invention.

FIG. 5 is a diagram similar to FIG. 1, showing the ventilation system 100 according to another embodiment of the invention. In FIG. 5, the room 10 may be, for example, a laboratory that includes one or more fume hoods 70 which exhaust a portion of the output air 12 drawn from the room 10 as auxiliary exhaust air 16'. As shown in FIG. 5, a fume hood exhaust airflow device 72 may be associated with the fume hood 70 to control the flow of the auxiliary exhaust air 16'. The fume hood exhaust airflow device 72 may be responsive to a command 74 that is derived, for example, from a sash position of the fume hood 70, as described in U.S. Pat. Nos. 4,706,553, 4,528,898, and 4,215,627, which patents are hereby incorporated herein by reference.

The ventilation system 100 shown in FIG. 5 may also include an airflow measuring device 76 that provides an auxiliary exhaust airflow 78 representing a flow of the auxiliary exhaust air 16'. As discussed above in connection with FIGS. 1 and 2, the airflow measuring device 76 may be any one of a variety of types of airflow sensors. Alternatively, the fume hood exhaust airflow device 72 may be capable of both receiving the command 74 and providing the auxiliary exhaust airflow 78; for example, the fume hood exhaust airflow device 72 may be a venturi-type valve, as discussed above.

While not shown explicitly in FIG. 5, the room 11 may be equipped with one or more additional controllable or fixed exhaust devices in addition to, or in place of, the fume hood 70. For example, the room 10 may include one or more canopy hoods, "snorkel" exhaust trunks, or exhausted storage cabinets. As discussed above, for purposes of the present disclosure, the fume hood 70 and/or any other fixed or controllable exhaust devices that may be present in the room 10 are referred to collectively as "auxiliary exhaust devices." Any exhaust airflow resulting from one or more auxiliary exhaust devices may be summed together to provide a total auxiliary exhaust airflow. Hence, in the case of more than one auxiliary exhaust device being present in the room 10, for purposes of the present discussion the auxiliary exhaust air 16' may be viewed as representing a summed exhaust from all auxiliary exhaust devices, and the auxiliary exhaust airflow 78 may be viewed as representing a total auxiliary exhaust airflow for the room.

Figure 6:
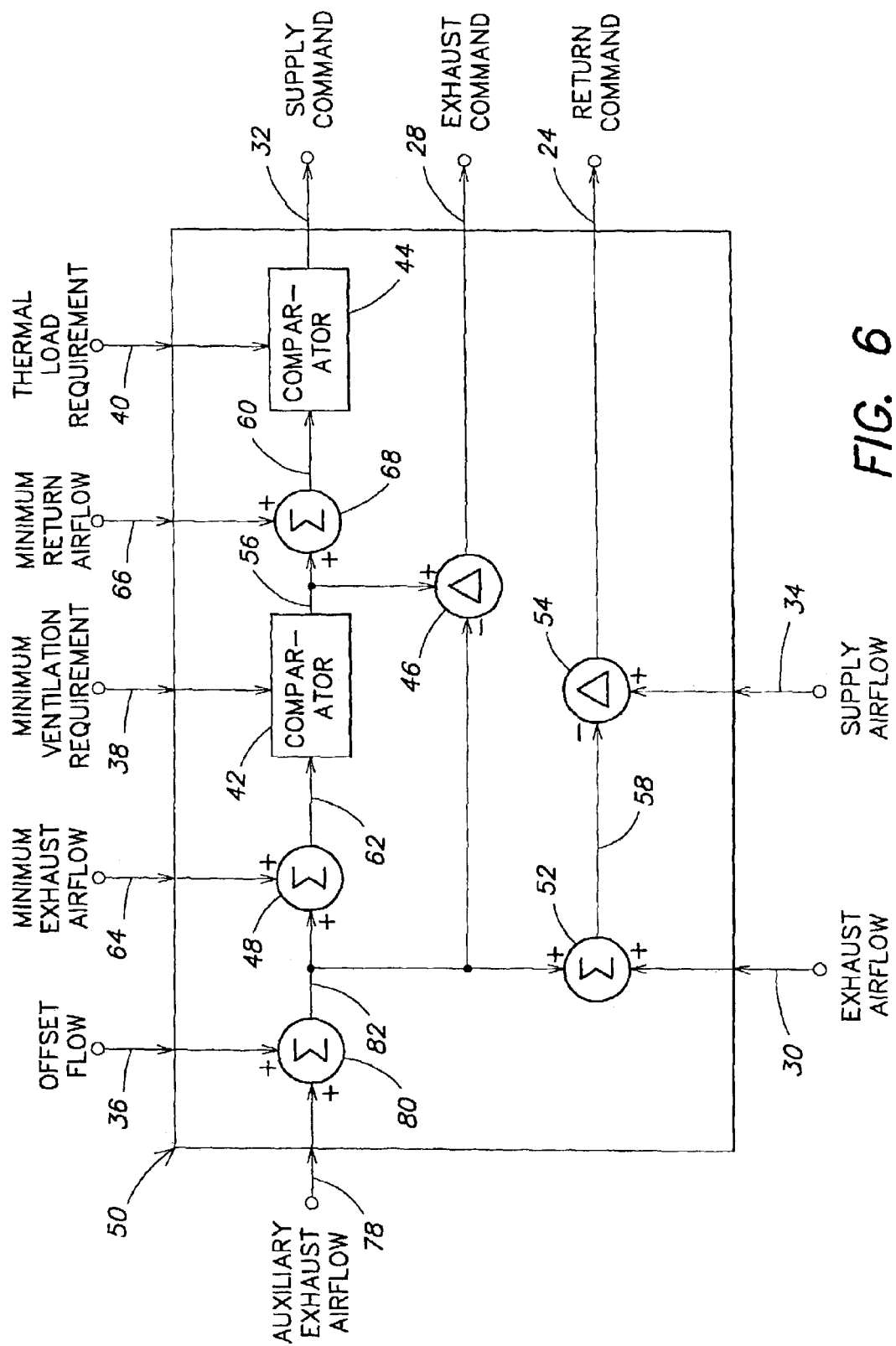
FIG. 6 is a diagram showing a controller according to another embodiment of the invention for use in the ventilation system shown in FIG. 5.

FIG. 6 is a diagram showing a controller 50 similar to that shown in FIG. 4, according to yet another embodiment of the invention. The controller 50 of FIG. 6 may be particularly suitable for use in the ventilation system 100 shown in FIG. 5. While substantially similar to the controllers shown in other figures, the controller 50 of FIG. 6 includes an additional input to accommodate the auxiliary exhaust airflow 78 of auxiliary exhaust airflow 16' shown in FIG. 5 (which potentially may include one or more other sources of exhaust airflow). The controller 50 of FIG. 6 includes an additional adder 80 to add the auxiliary exhaust airflow 78 to the offset flow set point 36 to provide a summed flow 82. The summed flow 82 in FIG. 6 subsequently is utilized by the controller 50 in a manner similar to that of the offset flow set point 36 of the controller shown in FIG. 4, as discussed above.

Following below is a table showing a number of example airflows for the ventilation system shown in FIG. 5 that result from the operation of the controller 50 shown in FIG. 6, based on various set points in deriving the airflows included in the table below, the following set points are used:

Offset flow set point (36)=0 cfm;

Minimum exhaust airflow (64)=100 cfm; and

Minimum return airflow (66)=100 cfm.

position of the fume hood 70, as discussed above. For example, in one embodiment, an airflow command for the fume hood exhaust device 72 shown in FIG. 5 could by provided by taking the higher of the sash position command 74 and the exhaust command 28.

Figure 6A:
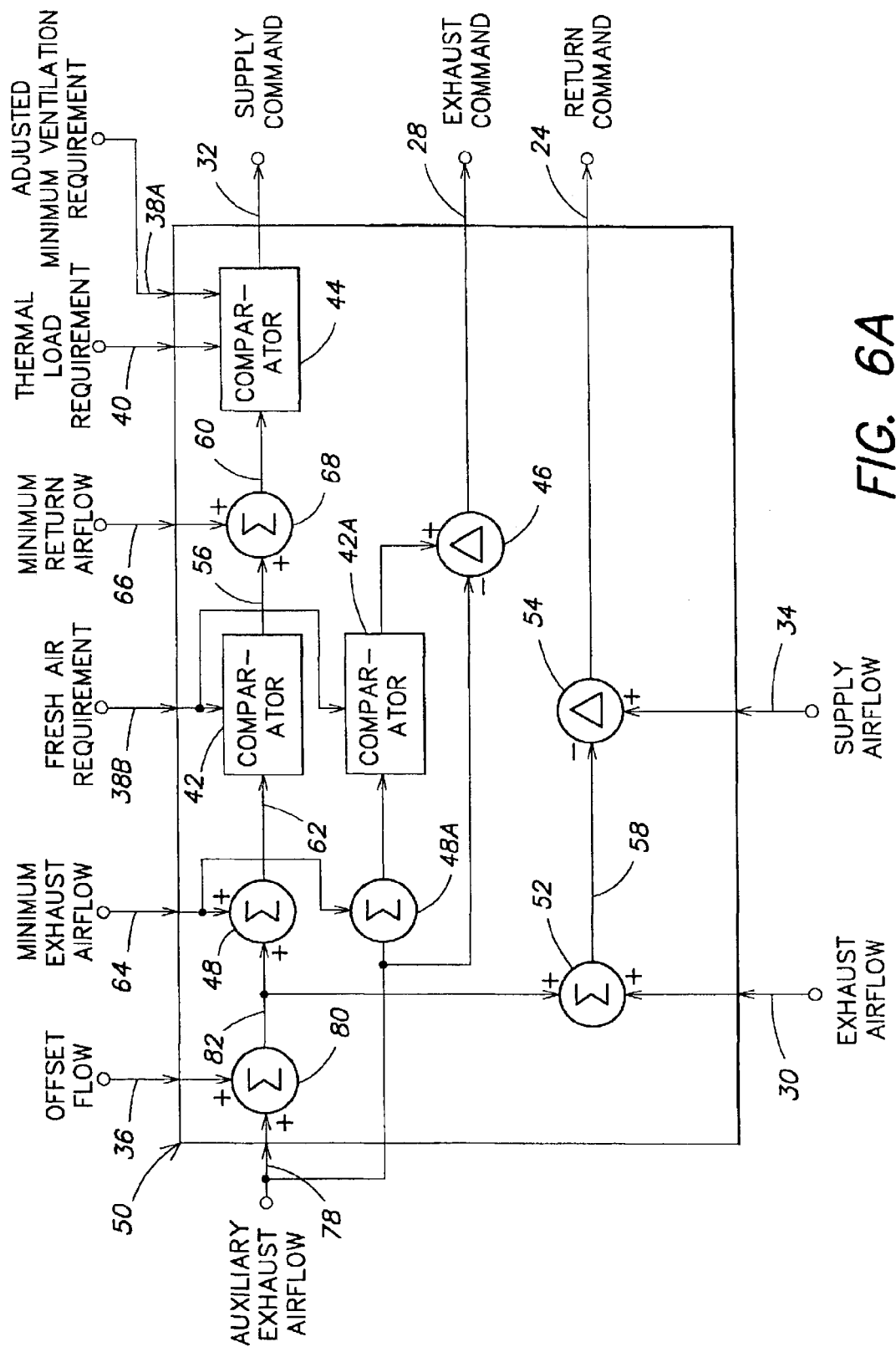
FIG. 6A is a diagram showing a controller according to another embodiment of the invention for use in the ventilation system shown in FIG. 5.

FIG. 6A is a diagram showing a controller 50 similar to that shown in FIG. 6, according to another embodiment of the invention. The controller 50 of FIG. 6A may be particularly suitable for use in the ventilation system 100 shown in FIG. 5 when it is desired to use a fresh air requirement 38B and an adjusted minimum ventilation requirement 38A, as discussed above in connection with FIG. 3A. In the embodiment of FIG. 6A, the exhaust command 28 is derived using an additional adder 48A and an additional comparator 42A. This is done since the offset flow 36 in this embodiment has no effect on the exhaust command 28, and since the exhaust command 28 should be solely related to making sure that the

| Min. Vent. Reqt. (38) | Thermal Load Reqt. (40) | Auxiliary Exhaust Airflow (78) | Exhaust Command (28) | Supply Command (32) | Sum of Exhaust, Auxiliary Exhaust, and Offset (58) | Return Command (24) |
| --- | --- | --- | --- | --- | --- | --- |
| 500 CFM | 300 CFM | 200 CFM | 300 CFM | 600 CFM | 500 CFM | 100 CFM |
| 500 CFM | 300 CFM | 1000 CFM | 100 CFM | 1200 CFM | 1100 CFM | 100 CFM |
| 500 CFM | 1000 CFM | 1000 CFM | 100 CFM | 1200 CFM | 1100 CFM | 100 CFM |
| 500 CFM | 1000 CFM | 200 CFM | 300 CFM | 1000 CFM | 500 CFM | 500 CFM |

In the embodiments of the ventilation system described above, it should be appreciated that any of the airflow devices, and in particular the exhaust airflow device 29, may be a variable, two-state, or constant volume airflow device depending on various operating modes of the ventilation system 100, as discussed further below. For example, the type of exhaust airflow device 29 employed in a particular embodiment of the ventilation system 100 may depend in part on the potential variability of the minimum ventilation requirement for different-uses of the room 10 (e.g., if potential contaminants are expected in the room from time to time or only on occasion), and if the room 10 includes one or more auxiliary exhaust devices, such as the fume hood 70 shown in FIG. 5.

Additionally, it should be appreciated that various embodiments of a ventilation system and a controller according to the invention, other than those discussed above, are possible based on combining particular features of the foregoing embodiments. For example, in one embodiment of the ventilation system 100, the room 10 may be equipped with a fume hood 70 and a fume hood exhaust airflow device 72, as shown in FIG. 5, but may not include an exhaust airflow device 29. In this embodiment, the minimum ventilation requirement 38 determines the minimum flow of the fume hood 70, as the exhaust air 16' constitutes all of the exhaust air drawn from the room 10. Accordingly, the fume hood exhaust airflow device 72 may be viewed as essentially substituting for the exhaust airflow device 29. As a result, a controller 50 similar to that shown in any of FIGS. 3, 3A, 4, or 4A, for example, may be employed in the ventilation system of this embodiment, with the auxiliary exhaust airflow 78 substituted for the exhaust airflow 30 where this input is used. Additionally, the fume hood exhaust airflow command 74 may be provided at least in part by the exhaust airflow command 28 output by the controller 50 or, alternatively, may be derived at least in part from a sash exhausted air out of the room is equal to or greater than the fresh air requirement 38B. Accordingly, only the supply and return flows are potentially increased or decreased by the offset flow 36. In one aspect of this embodiment, the total exhaust from auxiliary exhaust devices could be monitored and when it decreases below some minimum level for the environment, the fresh air requirement 38B could be increased to increase the total exhaust out of the environment which would then increase the total fresh outside air brought into the environment. It should be appreciated that the concept of a fresh air requirement 38B and an adjusted minimum ventilation requirement 38A, as an alternative to the minimum ventilation requirement 38 shown in FIG. 6, may be implemented in any of the controllers discussed further below, according to other embodiments of the invention.

Figure 7:
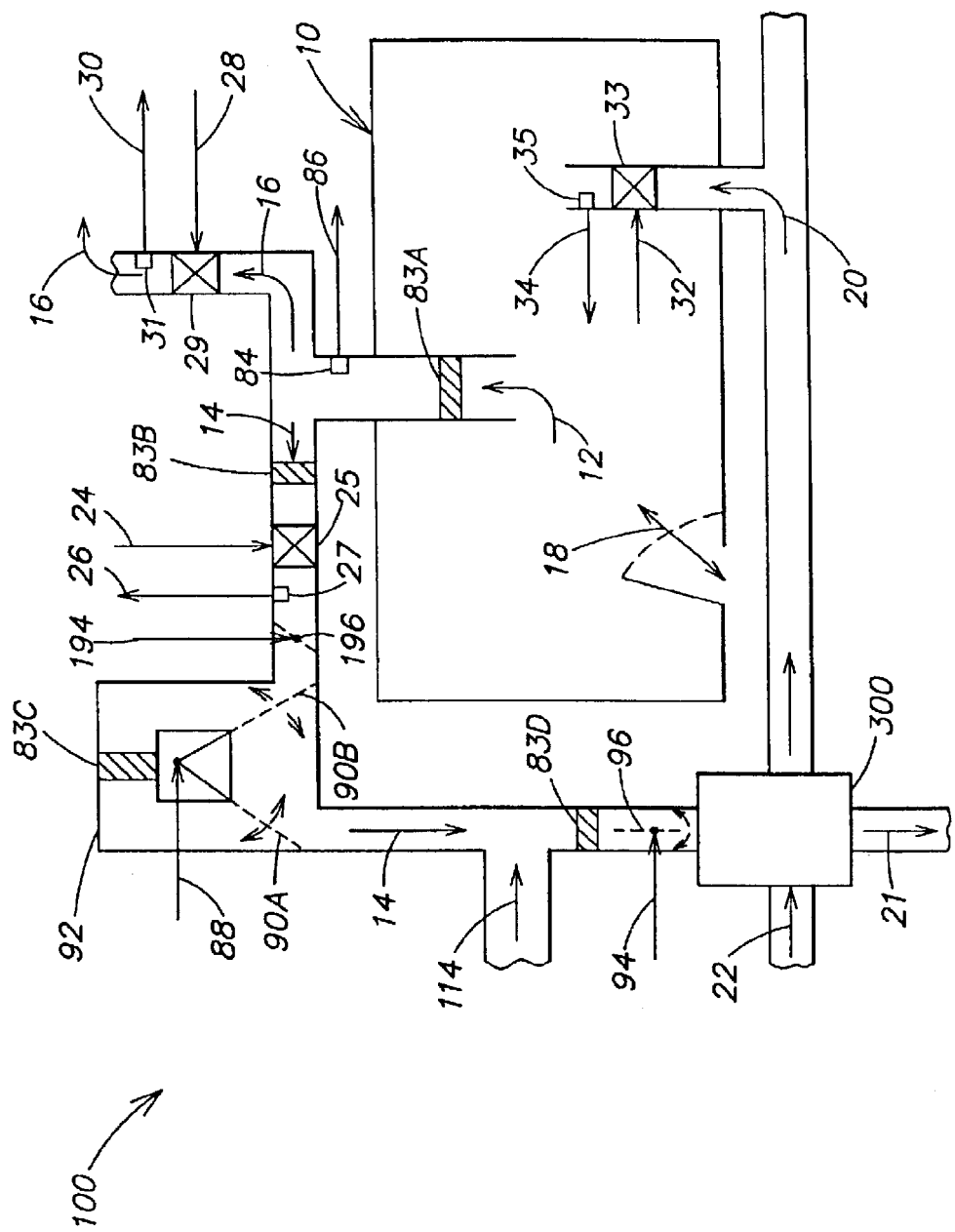
FIG. 7 is a diagram showing the ventilation system of FIG. 1 according to another embodiment of the invention.

FIG. 7 is a diagram showing yet another embodiment of a ventilation system 100 according to the invention. While the configuration of the ventilation system 100 shown in FIG. 7 is similar to the configuration of the system shown in FIG. 1 (i.e., having a single duct for output air drawn from the room), it should be appreciated that the concepts and features described in connection with FIG. 7 may be implemented in the ventilation system 100 of FIG. 2 (i.e., having separate return and exhaust ducts for output air drawn from the room), FIG. 2A (i.e., having one or more return/exhaust dampers and an output airflow device), and FIG. 5 (i.e., in which the room includes one or more auxiliary exhaust devices such as a fume hood).

In the embodiment of FIG. 7, two additional features of the ventilation system 100 not shown in the previous figures are illustrated; namely, a first feature related to filtration of return air, and a second feature related to sensing the quality of air drawn from the room 10 for a variety of potential contaminants and/or other undesirable characteristics (e.g., unpleasant odors). As noted above, it should be appreciated that one or both of the filtration and air quality sensing features discussed further below may be implemented in a ventilation system according to various embodiments of the invention.

With respect to filtration, FIG. 7 shows that the ventilation system 100 may include one or more filters 83A, 83B, 83C, and 83D. The location of the filters shown in FIG. 7 is for purposes of illustration only, and one or more filters similar to those shown in FIG. 7 may be placed in various locations throughout the ventilation system 100. Additionally, while FIG. 7 shows four filters at various locations in a path of the return air 14, the ventilation system 100 of FIG. 7 is not limited in this respect. In particular, the embodiment of FIG. 7 does not necessarily require that all four of the filters shown be implemented simultaneously, and any one or more of the filters shown in FIG. 7 optionally may be included in the ventilation system 100.

FIG. 7 shows a first filter 83A located in the path of the output air 12, as the output air is drawn from the room 10. A second filter 83B is shown in the path of return air 14 and is located prior to (i.e., upstream of) the return airflow device 25. A third filter 83C is shown located in a bypass duct 92 after (i.e., downstream of) the return airflow device 25, and a fourth filter 83D is shown in the path of the return air 14 after it has been combined with return air 114 from one or more other rooms of the ventilated environment, and before being combined in the air handling unit 300 with the outside air 22 to form the supply air 20.

A variety of chemical filters or particulate filters (e.g., high-efficiency particulate HEPA filters) are suitable for use as the filters 83A–D shown in FIG. 7, and may be selected based at least in part on the particular application (e.g., the expected air quality of the room 10) for which the ventilation system 100 is employed. For example, while various chemical filters typically may be employed in chemistry laboratories or labs in which a variety of volatile substances may be handled, HEPA filters may be particularly useful in biological laboratory settings for filtering out microbials such as bacteria or viruses.

With respect to air quality level, FIG. 7 shows that, according to one embodiment, the ventilation system 100 may include one or more air quality sensors 84 to sense an air quality level of at least a portion of the output air 12 drawn from the room 10. In particular, one or more sensors 84 may detect a contaminant level of at least a portion of the output air 12 and provide a sensed contaminant level 86. For purposes of this disclosure, the term "contaminant" not only refers to potentially harmful substances that may be airborne, but may also include airborne substances that may contribute to a generally undesirable characteristic of air (e.g., offensive odors).

It should be appreciated that, since potential contaminants primarily in the return air 14 are of concern (since the exhaust air 16 is exhausted from the room 10 and not returned to the ventilated environment), one or more sensors 84 may be placed in various locations along the path of the return air 14. In particular, while FIG. 7 shows one sensor 84 located in the path of the output air 12 before the output air 12 is divided into the return air 14 and the exhaust air 16, one or more sensors 84 may be placed at other locations along the path of the return air 14.

In the embodiment of FIG. 7, a variety of types of sensors 84 may be employed in the ventilation system 100 to detect a variety of potential contaminants. For example, one or more sensors 84 may include a pH sensor to detect the presence of acids or bases. Additionally, one or more sensors 84 may include a total volatile organic compound (TVOC) sensor (i.e., infrared, photo-ionization, or photo-acoustic type TVOC sensors). TVOC sensors may be useful to detect the presence of hundreds of different chemicals, making them akin to a "dirty air" sensor. If it is anticipated that specific chemicals potentially may be present in the room 10, one or more sensors 84 in the ventilation system 100 shown in FIG. 7 may include a specific chemical sensor, such as an electrochemical based sensor.

In general, one or more air quality sensors 84 of the ventilation system 100 shown in FIG. 7 may detect the presence of potentially harmful gases and vapors (e.g., carbon monoxide, acid or base vapors, volatile organic compounds, and other harmful compounds such as formaldehyde), a variety of potentially harmful microbes (e.g., virus, bacteria, fungus), and other potentially harmful particulates. One or more sensors 84 may be also used to detect the presence of smoke or fire, through the detection of smoke particles and/or gases typically associated with combustion. Moreover, one or more sensors 84 may be used to detect potential allergens. For example, in rooms 10 used as animal laboratories, the presence of ammonia may be detected and used as a proxy for levels of rat urine protein and mouse urine protein in the return air 14, which may be potentially harmful allergens to lab personnel working in the room 10 and other rooms that receive the common supply air 20 from the air handling unit 300.

As shown in the embodiment of FIG. 7, one or more sensors 84 may be used in combination with one or more filters 83A–D in the ventilation system 100 to control and/or condition the return air 14 returned to the room 10. In particular, FIG. 7 shows that the path of the return air 14 may include a bypass duct 92 which includes the filter 83C. The return air 14 may be diverted to the bypass duct 92 via the action of one or more dampers 90A and 90B. The one or more dampers 90A and 90B in turn may be responsive to a filter bypass command 88.

In one aspect of this embodiment, the dampers 90A and 90B are normally positioned such that the return air 14 does not flow into the bypass duct 92 and hence, bypasses the filter 83C. However, when one or more sensors 84 sense a particularly high level of one or more contaminants, the dampers 90A and 90B may be operated such that the return air 14 is diverted into the bypass duct 92 and hence flows through the filter 83C. In this manner, the return air 14, in which contaminants have been detected, is selectively filtered based on the contaminant level. The filter bypass command 88 which controls the one or more dampers 90A and 90B may be derived from the sensed contaminant level 86, as discussed further below.

FIG. 7 also shows that, according to one embodiment, the ventilation system 100 may include a main return duct shutoff damper 96 that is responsive to a shutoff damper command 94. The shutoff damper command 94 may be derived from the sensed contaminant level 86 or from other parameters, as discussed further below. For example, the main return shutoff damper 96 may be operated in the instance of a fire or other severe condition that may require backup and/or emergency control of the return air 14 and/or return air 114 from one or more other rooms of the ventilated environment. In particular, the presence of smoke or fire might be sensed in some instances by one or more sensors 84 in one or more particular rooms of the ventilated environment; alternatively, smoke or fire may be detected by a dedicated fire detection system for the ventilated environment. In either situation, in one aspect, the main return shutoff damper 96 may be controlled based on the presence of contaminants anywhere in the ventilated environment.

The room 10 shown in FIG. 7 is further equipped with a branch return shutoff damper 196 that is responsive to a branch shutoff command 194. The branch return duct shutoff damper 196 shown in FIG. 7 may be particularly useful when employed in combination with a venturi-type valve used for the return airflow device 25. In particular, since a venturi-type valve typically is not designed to completely prohibit flow through the valve, the branch return duct shutoff damper 196 may provide an additional level of security to users of the room 10 that the flow of return air 14 from the room 10 can be completely prohibited if necessary.

Figure 8:
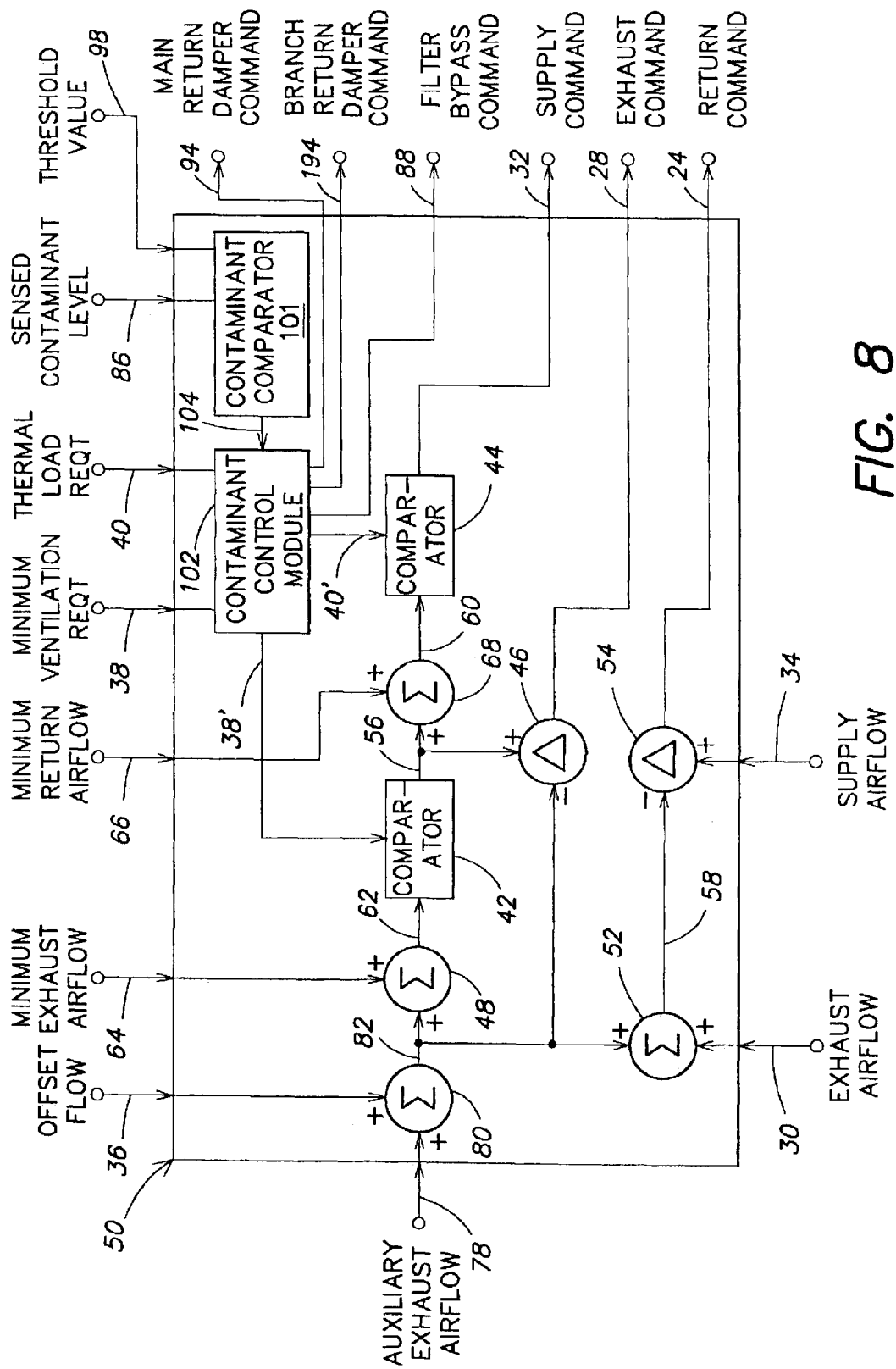
FIG. 8 is a diagram showing the controller of FIG. 6 according to another embodiment of the invention for use in the ventilation system shown in FIG. 7.

FIG. 8 is a diagram showing a ventilation system controller 50 according to yet another embodiment of the invention. Portions of the controller 50 of FIG. 8 are substantially similar to the controller 50 shown in the embodiment of FIG. 6. In particular, the controller 50 of FIG. 8 optionally may include the adder 80 which permits an auxiliary exhaust airflow 78 to be added to the offset flow set point 36 if one or more auxiliary exhaust devices are employed in the room 10. It should be appreciated that, while FIG. 7 does not explicitly show any auxiliary exhaust devices in the ventilation system 100, according to other embodiments (e.g., see FIG. 5) one or more auxiliary exhaust devices may be located in the room 10. Accordingly, as discussed above, the controller 50 shown in FIG. 8 may or may not include the adder 80 depending on the presence of auxiliary exhaust devices in the room 10.

The embodiment of the controller 50 shown in FIG. 8 may be particularly suitable for use in the ventilation system 100 shown in FIG. 7. Specifically, the controller 50 in FIG. 8 includes a contaminant comparator 101 and a contaminant control module 102 to facilitate airflow control in the ventilation system 100 based on one or more sensed contaminant levels 86, which are derived from one or more sensors 84 in the ventilation system 100 as shown in FIG. 7.

In the controller 50 of FIG. 8, the contaminant comparator 101 receives one or more sensed contaminant levels 86 and one or more threshold values 98, and compares at least one sensed contaminant level to at least one threshold value. The contaminant comparator outputs one or more commands 104 based on at least one comparison of a sensed contaminant level and a threshold value. One or more threshold values 98 may be derived from threshold limit values (TLVs) or permissible exposure levels (PELs), as established by the occupational safety and health administration (OSHA) and the American Congress of Government Industrial Hygienists (ACGIH), for particular harmful substances that are expected to be present in the room. The derivation of threshold values 98 is discussed further below, in connection with FIG. 9.

The contaminant control module 102 in the controller 50 of FIG. 8 may also output the filter bypass command 88 to operate the dampers 90A and 90B shown in FIG. 7, as well as the main return duct shutoff damper command 94 which operates the main return duct shutoff damper 96, and the branch return shutoff damper command 194 which operates the branch return duct shutoff damper 196, both shown in FIG. 7. As discussed above in connection with FIG. 7, the filter bypass command 88 may control one or more dampers 90A and 90B to divert return air 14 to a bypass duct 92 including a filter 83C, if a particular contamination level is sensed. Similarly, the main return shutoff damper command 94 may control the main shutoff damper 96 to prohibit a flow of any air returned to the air handling unit 300 if a particular contaminant level is sensed, and/or if a particular emergency situation exists (e.g., fire, smoke, chemical spill). Additionally, if only the return air 14 from a particular room (e.g., the room 10) is to be completely shut off, then the branch return shutoff damper command 194 may be used to close the branch return shutoff damper 196 for that room.

As shown in FIG. 8, the contaminant control module 102 of the controller 50 receives one or more commands 104 from the contaminant comparator 101, and may perform a variety of functions to control airflow in the ventilation system based on the one or more commands 104. In particular, as shown in the embodiment of FIG. 8, the contaminant control module 102 also receives as inputs the minimum ventilation requirement 38 and the thermal load requirement 40. According to one aspect of this embodiment, the contaminant control module 102 outputs an auxiliary minimum ventilation requirement 38' and an auxiliary thermal load requirement 40' based on one or more commands 104.

For example, in one aspect of the embodiment of FIG. 8, if a command 104 indicates that a sensed contaminant level 86 is below a threshold value 98, the contaminant control module 102 outputs the minimum ventilation requirement 38 as the auxiliary minimum ventilation requirement 38'. Similarly, if the command 104 indicates that the sensed contaminant level 86 is less than the threshold value 98, the contaminant control module 102 outputs the thermal load requirement 40 as the auxiliary thermal load requirement 40'. Under these circumstances, the controller 50 functions similarly to the controller shown in FIG. 6; namely, if the sensed contaminant level 86 is below the threshold value 98, the controller 50 of FIG. 8 functions essentially as the controller shown in FIG. 6.

In another aspect of the controller 50 shown in FIG. 8, the contaminant control module 102 may output one or both of an auxiliary minimum ventilation requirement 38' and an auxiliary thermal load requirement 40' that are different from the minimum ventilation requirement 38 and the thermal load requirement 40, based on a sensed contaminant level 86 that exceeds a threshold value 98. By controlling the auxiliary minimum ventilation requirement 38' and the auxiliary-thermal load requirement 40' (i.e., in some cases by modifying the minimum ventilation requirement 38 and the thermal load requirement 40), the contaminant control module 102 may affect the flow of one or more of the return air, the exhaust air, and the supply air in the ventilation system in a number of ways via the return airflow command 24, the exhaust airflow command 28, and the supply airflow command 32 (as well as via the main return duct shutoff damper command 94 and the branch return duct damper command 194).

For example, a first option for the contaminant control module 102 when a sensed contaminant level 86 exceeds a threshold value 98 is to maintain the exhaust airflow and significantly reduce the return airflow by reducing the supply airflow. The contaminant control module 102 may accomplish this, for example, by outputting an auxiliary minimum ventilation requirement 38' and an auxiliary thermal load requirement 40' such that the summed flow 60 provided to the comparator 44 in the controller 50 of FIG. 8 is greater than the auxiliary thermal load requirement 40'. This can be achieved, for example, by reducing the auxiliary thermal load requirement 40' to zero (or at least to less than or equal to the auxiliary minimum ventilation requirement 38'). In this manner, the supply airflow command 32 reflects primarily airflow requirements associated with the exhaust air. Hence, the summed flow 58 (i.e., the total sum of exhaust airflows) provided to the subtracter 54 is essentially equal to the supply airflow 34 and, as a result, the return airflow command 24 is essentially zero (or represents some minimum return airflow).

A second option for the contaminant control module 102 shown in FIG. 8 when a sensed contaminant level 86 exceeds a threshold value 98 is to maintain the supply airflow and increase the exhaust (and/or auxiliary exhaust) airflow. With reference again to the subtracter 54 of the controller 50 shown in FIG. 8, increasing the exhaust and/or auxiliary exhaust airflow while holding constant the supply airflow also accomplishes a reduction in the return airflow command 24 and, hence, a corresponding reduction in the return airflow. The contaminant control module 102 may implement this option by outputting an auxiliary minimum ventilation requirement 38' which is equal to the greater of the original thermal load requirement 40 and the original minimum ventilation requirement 38, such that the supply airflow command 32 reflects primarily exhaust airflow requirements, as in the first option discussed above. In this option, the contaminant control module 102 may output the thermal load requirement 40 as the auxiliary thermal load requirement 40'.

A third option for the contaminant control module 102 of FIG. 8 when a sensed contaminant level 86 is greater than a threshold value 98 is to place the room 10 into an "emergency exhaust condition," for example, if a significantly high level of contaminant is sensed. In this option, the contaminant control module 102 may reduce the return airflow command 24 to as close to zero as possible, and increase the exhaust and/or auxiliary exhaust airflows to a maximum value. The contaminant control module 102 may accomplish this by outputting an auxiliary minimum ventilation requirement 38' that is greater than the auxiliary thermal load requirement 40', potentially at as high a value as necessary to place the exhaust airflow at a maximum level. Additionally, the contaminant control module 102 may output the branch return duct shutoff damper command 194 so as to completely close the branch shutoff damper 196, thereby essentially prohibiting the flow of any return air from the room 10. Alternatively, or in addition to the foregoing, the offset flow set point 36 may be selected such that the supply airflow command 32 controls the supply airflow so as to place the room into a severe negative pressure condition. This may be accomplished by selecting a negative offset flow set point (given the sign convention adopted herein for the offset flow set point 36, as discussed above).

A fourth option for the contaminant control module 102 of FIG. 8 when a sensed contaminant level 86 exceeds a threshold value 98 is to partially reduce (rather than prohibit) the flow of return air. In this option, the contaminant control module 102 operates on the principal that the return air drawn from the room in which an excessive contaminant level is detected is appreciably diluted by outside air, as well as initially by return air from other rooms (assuming these other rooms initially do not contain any contaminated air), before being recirculated to the ventilated environment as supply air. A dilution level of the supply air increases as the amount of outside air in the supply air is increased, or alternatively, as the amount of contaminated return air from the room is decreased in the supply air.

Accordingly, as the flow of return air 14 from the room 10 is reduced, the level of contaminants detectable in the supply air recirculated to the ventilated environment is reduced due primarily to dilution caused by outside air, but to some extent also due to dilution caused by return air from other rooms that initially do not contain contaminated air. Hence, as the sensed contaminant level 86 approaches and perhaps exceeds the threshold value 98, the contaminant control module 102 may reduce the return airflow command 24, for example, by outputting a reduced auxiliary thermal load requirement 40' so as to reduce the supply airflow command 32, which in turn reduces the return airflow command 24 via the subtracter 54. The contaminant control module 102 may reduce the return airflow, for example, in a gradual, continuous fashion, or in step-wise increments.

While the various functions of the contaminant control module 102 of the controller 50 shown in FIG. 8 are explained above in terms of controlling an auxiliary minimum ventilation requirement 38' and an auxiliary thermal load requirement 40', it should be appreciated that the invention is not limited in this respect. In particular, according to other embodiments of the invention, the contaminant control module 102 may control one or more of the supply, the exhaust, and the return airflows in the ventilation system 100 in any of numerous ways, as the contaminant control module 102 and the controller 50 are not limited to any specific manner of implementation.

For example, rather than receiving as inputs the minimum ventilation requirement 38 and the thermal load requirement 40 and outputting the auxiliary minimum ventilation requirement 38' and the auxiliary thermal load requirement 40' based on one or more commands 104, the contaminant control module 102 shown in FIG. 8 may instead receive as inputs the supply airflow command 32, the exhaust airflow command 28, and the return airflow command 24, and output corresponding auxiliary commands 32', 28', and 24', respectively, based on one or more commands 104 provided by the contaminant comparator 101. Again, it should be appreciated that the controller 50 shown in FIG. 8 is provided as an example for purposes of illustration only, and that the invention is not limited to this specific implementation of a ventilation system controller.

Figure 9:
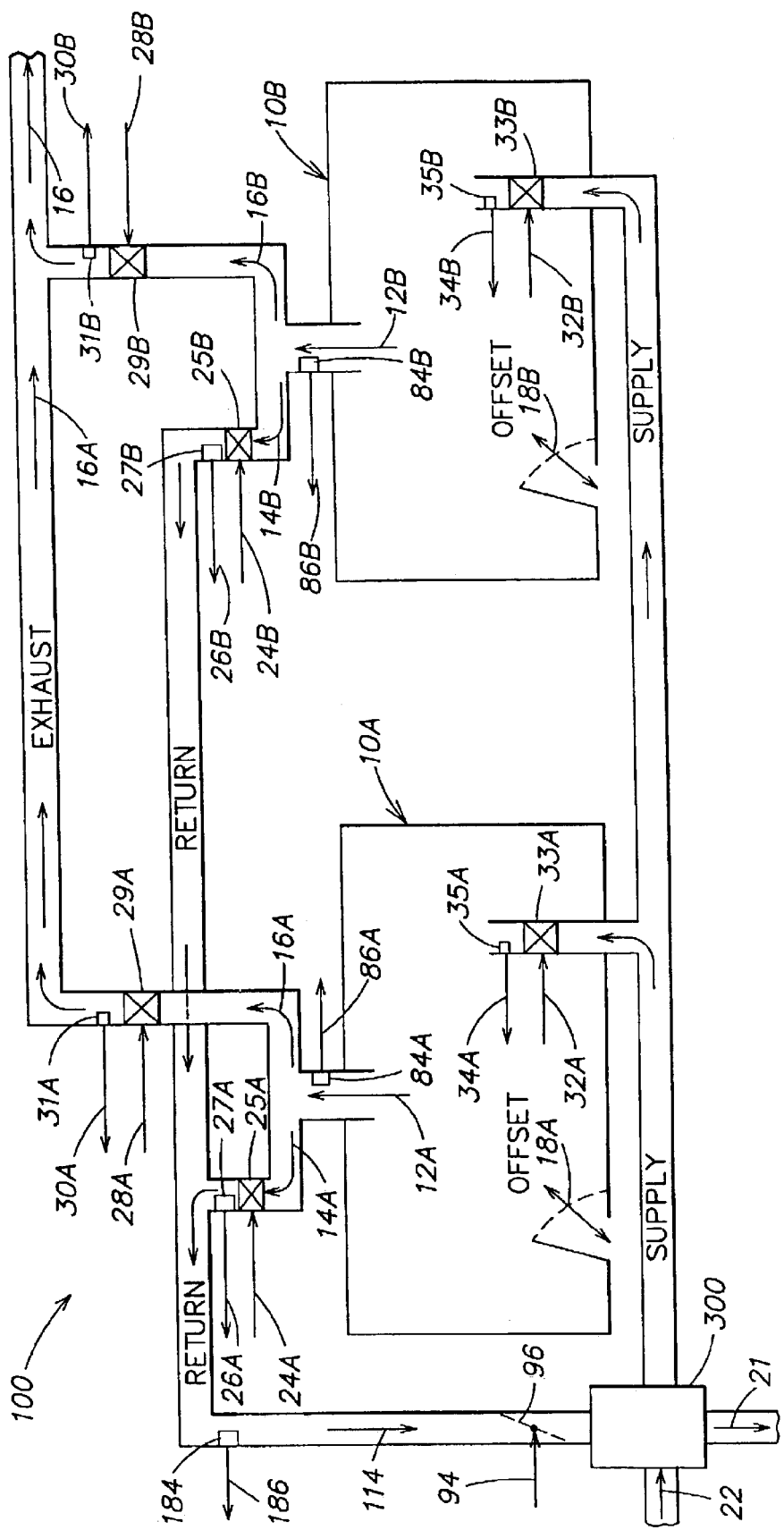
FIG. 9 is a diagram showing a ventilation system for multiple rooms according to another embodiment of the invention.

FIG. 9 is a diagram of a portion of a ventilation system 100 for a multiple room ventilated environment, according to yet another embodiment of the invention. In the embodiment of FIG. 9, the ventilated environment includes at least a first room 10A and a second room 10B. For purposes of illustration, the first and second rooms 10A and 10B are configured in FIG. 9 similarly to that of the room 10 shown in FIG. 1; namely, each room 10A and 10B includes a single duct from which output air 12A and 12B respectively is drawn. As in FIG. 1, for each room 10A and 10B, the output air is respectively divided into return air 14A and exhaust air 16A, and return air 14B and exhaust air 16B. It should be appreciated, however, that for one or both of the rooms 10A and 10B shown in FIG. 9, the room configurations shown in any of FIGS. 2, 2A, 5, or 7 may be employed (i.e., dual output ducts, return/exhaust dampers and output airflow device, one or more auxiliary exhaust devices), or other similar configurations not explicitly discussed herein.

In particular, while not explicitly shown in FIG. 9, one or both of the rooms 10A and 10B may include one or more auxiliary exhaust devices such as fume hoods, canopies, snorkels, storage cabinets, and the like. Additionally, one or both of the rooms 10A or 10B may include one or more auxiliary exhaust devices as the only means for exhausting air from the rooms (i.e., there is no exhaust air path including an exhaust airflow device such as 29A or 29B). Furthermore, at least one of the rooms 10A and 10B may not include any means of exhausting air from the room, and provide only for supply air being supplied to the room and return air being drawn from the room, as discussed further below. In any of the foregoing configurations, various filtration and/or air quality sensing features, as discussed above in connection with FIG. 7, may also be employed.

While FIG. 9 shows two rooms 10A and 10B which make up the ventilated environment, it should be appreciated that the ventilated environment may include any number of rooms having a variety of purposes, and that different rooms may be differently configured. For example, one room of the ventilated environment may be configured similarly to the room shown in FIG. 1, another configured similarly to the room shown in FIG. 2, yet another configured similarly to the room shown in FIG. 5, yet another having one or more auxiliary exhaust devices as the only means for exhaust, yet another having only one or more auxiliary exhaust devices and no return air path, and yet another having only a return air path and no means for exhausting air from the room. Essentially, according to one embodiment, the only requirement for the ventilated environment shown in FIG. 9 is that at least one room in the environment includes both a return air path and an exhaust air path, and that the flow of return air and exhaust air drawn from the room is controllable so as to independently satisfy a minimum ventilation requirement for the room and a thermal load requirement for the room.

In the embodiment of FIG. 9, each room 10A and 10B is shown associated with a respective supply airflow device 33A and 33B, a respective return airflow device 25A and 25B, and a respective exhaust airflow device 29A and 29B. The airflow devices in each room may be controlled such that a thermal load requirement for each room and a minimum ventilation requirement for each room are satisfied independently. In the ventilation system shown in FIG. 9, one or more controllers 50 similar to those shown in the embodiments of FIGS. 3, 3A, 4, 6, and 8 may be used to control the airflow devices in each room. For example, the ventilation system may employ one controller 50 for each room in the ventilated environment to control the airflows associated with that particular room, or a single "central" controller to control airflows in all of the rooms, wherein the single controller may include any of the features discussed above in connection with the various controller embodiments. Alternatively, the ventilation system may employ multiple controllers, where each controller controls airflows in particular groups of rooms in the ventilated environment. It should be appreciated that various features included in one or more controllers employed in the ventilation system 100 shown in FIG. 9 may depend in part on the configuration of the return, exhaust, and auxiliary exhaust airflow devices in each room, and the potential presence of contaminants in each room, as discussed above.

As in FIG. 7, FIG. 9 shows that the ventilation system 1100 may include a main return duct shutoff damper 96 that is responsive to a main return duct shutoff damper command 94. Additionally, FIG. 9 shows that for each room 10A and 10B, an air quality sensor 84A and 84B, respectively, may be located in a path of the output air drawn from each room. As discussed above in connection with FIG. 7, one or more air quality sensors associated with each room 10A and 10B may be located anywhere in the path of return air from a particular room. In addition to, or alternatively to, one or more sensors in the return air path of each room, the ventilation system 100 of FIG. 9 may include one or more air quality sensors 184 located in a path of the combined return air 14 from both of the rooms 10A and 10B or, more generally, in the path of combined return air from some group of rooms in a multi-room ventilated environment. Each of the sensors 84A, 84B, and 184 shown in FIG. 9 provides a respective sensed contaminant level 86A, 86B, and 186.

As discussed above, while FIG. 9 shows two similarly configured rooms that are served by the ventilation system 100, it should be appreciated that a ventilated environment in which a ventilation system according to the invention is employed may contain a number of rooms, some of which are similarly configured and some of which are differently configured. For example, the ventilated environment served by a ventilation system according to one embodiment of the invention may be a laboratory facility, and may include some rooms in which potentially harmful substances are handled regularly, other rooms which may occasionally be exposed to potentially harmful substances (e.g., analytical instrumentation rooms), other rooms which may serve as storage areas, other rooms which may serve as office areas, other rooms which may be "clean room" environments, other rooms which may serve as computer labs, and the like. Each of these rooms may or may not have a unique minimum ventilation requirement and/or a unique thermal load requirement. The ventilation system 100 of FIG. 9, in conjunction with one or more controllers 50 as discussed above, controls the flow of air supplied to and drawn from each of the rooms in the ventilated environment so as to satisfy their various respective ventilation requirements.

For example, in rooms of such a laboratory facility in which chemical or other potentially harmful substances are regularly handled, the room likely will include one or more auxiliary exhaust airflow devices such as fume hoods, canopies, snorkels, and storage cabinets. In this type of room, the ventilation system 100 and one or more controllers 50 may control one or more of the return airflow, the supply airflow, the general exhaust airflow, and the auxiliary exhaust airflow to satisfy the particular ventilation requirements of the room. In other "lab support" rooms of the facility that may not have any auxiliary exhaust airflow devices, but nevertheless may be exposed to potentially harmful substances from time to time, the ventilation system and one or more controllers may control one or more of the return airflow, the general exhaust airflow, and the supply airflow to the room to satisfy that room's particular ventilation requirements.

Likewise, some rooms in a such a lab facility may have one or more auxiliary exhaust airflow devices without having any other means of exhausting air from the room. In this type of room, the ventilation system 100 and one or more controllers 50 may be used to control one or more of the auxiliary exhaust airflow devices, such that at least the minimum ventilation requirement is satisfied. For yet other rooms in the lab environment, it may be very unlikely that the room or rooms are ever exposed to potentially harmful substances. These rooms, such as offices, dry lab areas, or instrumentation and/or computer labs, for example, may not include any means of exhausting air from the room, and may merely include means for providing supply air to the room and drawing return air from the room. In such rooms, the ventilation system 100 and one or more controllers 50 may nonetheless monitor the return air drawn from the room for the presence of contaminants. In the unlikely event that a significant level of contaminants is detected in such a room or rooms, the ventilation system 100 and one or more controllers 50 may reduce both the supply airflow and the return airflow to and from the affected room or rooms so as to reduce the potential for contamination in other rooms in the facility. Alternatively, the ventilation system 100 and one or more controllers 50 may increase the supply airflow to such a room or rooms while reducing the return airflow, so as to purge the contaminated areas.

Additionally, there may be one or more rooms of such a facility, in which the ventilation system 100 of FIG. 9 is employed, which contain hazardous chemicals that cannot be sensed. Alternatively, these rooms may contain very toxic chemicals that can be sensed, but only at levels above that required to ensure safe recirculation of return air. In both of these cases, if an amount of the potentially harmful substance typically used in the room could create a hazard if spilled or volatized, it may be desirable not to use any return air from such rooms while nonetheless using return air from other rooms in the facility. For these and other reasons, no path for return air may be provided in such a room or, alternatively, a return airflow device or damper may be operated so as to prohibit the flow of return air drawn from such a room. Although return air may not be recirculated in this type of room, an exhaust and/or auxiliary exhaust airflow device for the room may nonetheless be controlled so as to satisfy both the minimum ventilation requirement and the thermal load requirement for the room.

With reference again to the controller 50 shown in FIG. 3, in such rooms in which no return air is utilized, the comparator 44 of the controller 50 may not be necessary, and the thermal load requirement 40 may be utilized as an additional input to the comparator 42. In this case, the output 56 provided by the comparator 42 represents the greatest of the thermal load requirement 40, the minimum ventilation requirement 38, and the offset flow set point 36. Absent the comparator 44, the output 56 of the controller 50 serves as the supply airflow command. The exhaust airflow command 28 is derived from the output 56 in a manner similar to that described above in connection with FIG. 3. In the present example, it should also be appreciated that the adder 52 and the subtracter 54 of the controller shown in FIG. 3 may no longer be necessary, as there is no need to supply a return airflow command 24.

In the ventilation system 100 shown in FIG. 9, one potential advantage of sensing the quality of return air as air is drawn from each room in the ventilated environment is that relatively high levels of contaminants may be sensed in a particular room (e.g., above the threshold limit for a particular contaminant), and the ventilation system 100 nevertheless may provide adequate returned air ventilation from that room to other rooms in the ventilated environment while still ensuring that exposure levels are below the threshold limit. This situation is possible due to the substantial dilution of the return air from each room before it is supplied back into various rooms of the ventilated environment as part of the supply air.

In particular, FIG. 9 shows that the return air from each room is mixed with the return air from other rooms in the ventilated environment and is then diluted by outside air 22 before being recirculated to the ventilated environment. For example, if the return airflow of a single "contaminated" room is 500 cfm, and the minimum total outside airflow supplied to all rooms in the environment is 25,000 cfm, then a minimum dilution ratio of any contaminants in the supply air to the contaminants in the return air from the contaminated room may be given by 500/25,000, or 0.02.

Accordingly, levels of contaminants in the return air from the contaminated room that are 50 times higher than the threshold limit value (TLV) or permissible exposure level (PEL) for a particular harmful substance may be detected, and the ventilation system is nonetheless capable of guaranteeing worst case exposure below these limits to anyone present in any of the rooms in the ventilated environment. In one embodiment of the invention, one or more threshold values 98 input to one or more controllers 50 similar to that shown in FIG. 8 may be derived from actual TLVs and/or PELs of potentially harmful contaminants, and may be adjusted or calibrated based on dilution ratios that are deemed suitable for a particular environment. For example, according to one embodiment, a general formula for a threshold value 98 for a given contaminant in a room, based on dilution, may be given by:

Room Threshold Value=(TLV or PEL)/(Dilution Ratio), where

Dilution Ratio=(Assumed contaminated return airflow)/(Total uncontaminated airflow).

Using the exemplary airflow values given above (i.e., setting the assumed contaminated return airflow to the return airflow of a single room=500 cfm, assuming only one room at a time may be contaminated, and setting the total uncontaminated airflow=25,000 cfm, i.e., the total outside or fresh airflow), the dilution ratio is equal to 0.02, and the room threshold value 98 for a contaminant having a TLV of one part per million (1 PPM), for example, would be 50 PPM based on the formulas above.

In the above scenario, if there is a concern that more than one room in the ventilated environment could have a harmful substance contamination simultaneously, then the dilution ratio could be increased to take this into account. In particular, based on the example given above, the assumed contaminated return airflow could be increased from 500 cfm for one room to something higher (e.g., 1000 cfm) to reflect a potential aggregate contaminated airflow from more than one room. This would increase the dilution ratio in the above example (i.e., using 1000 cfm instead of 500 cfm for the assumed contaminated return airflow would increase the dilution ratio from 0.02 to 0.04), and hence decrease the threshold level 98 for a contaminant having a TLV of 1 PPM from 50 PPM to 25 PPM. This type of procedure could be employed to provide an extra measure of dilution protection against contaminants given a particular target assumed contaminated return airflow, whether or not it is actually anticipated that multiple rooms would experience contamination simultaneously.

Additionally, while the total outside airflow was used in the above example to represent the total uncontaminated airflow, it should be appreciated that the invention is not limited in this respect. In particular, as discussed above, initially return air from other rooms of the controlled environment that do not contain contaminants may also contribute to a dilution of the return air from a contaminated room. Eventually, due to mixing of the return air from the contaminated room into the common source of supply air, these other initially uncontaminated rooms receive some level of contaminant which in turn gets recirculated from these rooms. However, typically there is some time constant associated with the contamination of other rooms due to recirculation. Accordingly, in some embodiments, the total uncontaminated airflow indicated in the formula above may not only include outside or fresh airflow, but may additionally take into consideration return airflow from initially uncontaminated rooms (e.g., the total uncontaminated airflow may be taken as the total supply airflow in some circumstances).

In considering the use of various dilution ratios to derive contaminant threshold values as discussed above, it should be appreciated that since the TLV and PEL levels of different potentially harmful substances may vary considerably, it is prudent in some cases to select one or more threshold values 98 based on the most harmful substances that may be present in a particular room of a ventilated environment (e.g., those substances having the lowest TLV or PEL levels).

Depending on the type of air quality sensor used, another factor which may contribute to the selection of one or appropriate threshold values 98 for one or more controllers 50 of a ventilation system 100 according to the invention relates to different calibration factors for different harmful substances that may be sensed by a single air quality sensor. For example, a photo-ionization type sensor can detect many different types of volatile organic compounds (VOCs). However, for a given sensed contaminant level 86 output by such a sensor, this level may represent different actual concentrations for different potentially harmful substances.

For example, a given air quality sensor may be calibrated based on the chemical toluene, such that a sensed contaminant level 86 of 1 PPM represents an actual toluene vapor concentration of 1 PPM. However, if the same sensor comes into contact with acetone, a 1 PPM sensed contaminant level 86 output by the sensor may correspond to an actual acetone vapor concentration of 5 PPM. For other materials, the sensor may output sensed contaminant levels that are higher than the actual concentration of sensed harmful substances (i.e., a 1 PPM sensed contaminant level may represent an actual concentration of 0.5 PPM of a particular harmful substance). Accordingly, the combination of a particular chemical's calibration coefficient with respect to a particular air quality sensor, as well as an optional dilution ratio factor as discussed above, may be an important consideration in some circumstances when selecting an appropriate threshold value 98. With commercial photo-ionization detectors such as the PPB-RAE by RAE Systems, a threshold value of about 1 PPM reflects a good compromise between a level low enough to detect many compounds but not so low as to trigger an excessive number of false alarms. In particular, typical background levels in a laboratory with such an instrument are typically about 200 to 300 PPB.

Figure 10:
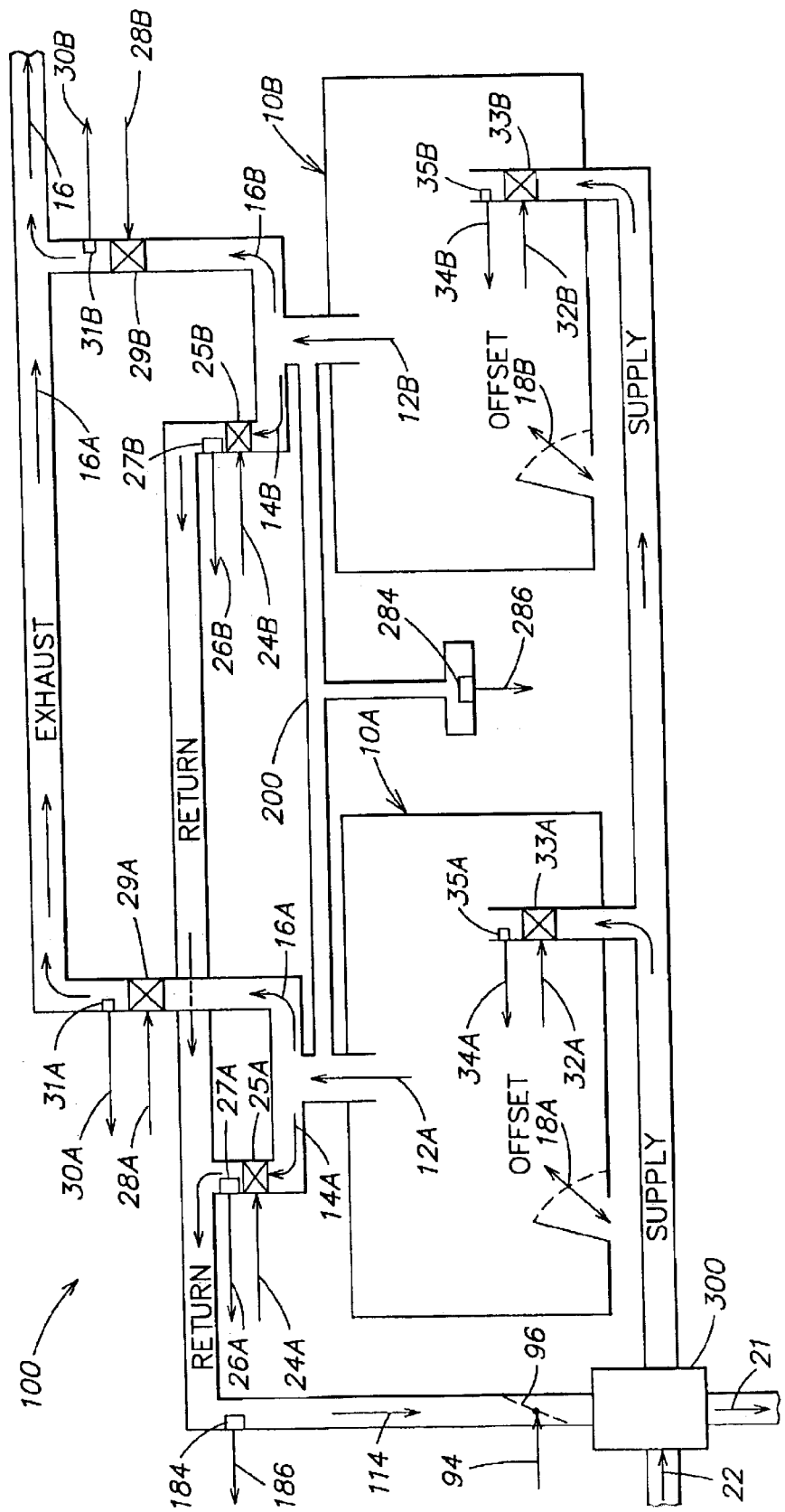
FIG. 10 is a diagram showing the ventilation system of FIG. 9 according to another embodiment of the invention.

FIG. 10 is a diagram showing a ventilation system 100 similar to that shown in FIG. 9, according to yet another embodiment of the invention. While FIG. 9 shows that one or more air quality sensors 84 may be used to detect the air quality of return air drawn from each room in the ventilated environment, FIG. 10 illustrates that one or more tubes 200 may be employed to transport samples of air drawn from each room to one or more sensors 284 situated at a single or "central" location. Although FIG. 10 shows an arrangement of tubes 200 coupled to each room 10A and 10B near a path of the output air drawn from each room, it should be appreciated that the invention is not limited in this respect, as other arrangements of tubes are possible (e.g., separate tubes from each room back to the sensors 284). Furthermore, air switching means such as a solenoid valve located in the proximity of the sensors 284 may be used with one or more sets of sensors to multiplex use of the sensors by selecting which tube and room is to be sampled, for example, in a sequential order or some other ordered pattern. Additionally, as shown in FIG. 10, the main return air duct sensor 184 located in the path of the combined return air 114 may be used in combination with one or more centrally located sensors 284 to determine air quality in one or more rooms of the ventilated environment. In view of the foregoing, it should be appreciated that a wide variety of sensing configurations may be implemented in the ventilation-system 100 according to various embodiments of the invention.

For example, in one embodiment, one or more tubes 200 as shown in FIG. 10 and one or more sensors 284 located at a "central" location may be configured as a networked air sampling system, as described in U.S. Pat. No. 6,125,710, hereby incorporated herein by reference. According to yet another embodiment, one or more tube arrangements similar to the tubes 200 shown in FIG. 10 may include branches that interconnect perhaps some but not all of the rooms in a given ventilated environment. In this embodiment, the branches of tubes may transport air from particular groups of rooms to one or more centrally located sensors 284. If a high level of potentially harmful substances is detected in the group of rooms, then the return airflow devices of those rooms in the group may be operated to reduce or prohibit the flow of contaminated return air.

In yet another embodiment using one or more "centrally" located sensors similar to that shown in FIG. 10, or a networked sampling system as described in the above-referenced patent application, a "mixed sampling" approach may be implemented. In this approach, output or return air from several rooms in the ventilated environment constituting a "set" of rooms is simultaneously sampled by one or more sensors similar to sensor 284. In one aspect of this embodiment, if a contaminant level above a threshold value is detected in the set of rooms collectively, the ventilation system samples air from the individual rooms in the set to determine in which room the harmful contaminant is present. In yet another aspect of this embodiment, to more rapidly locate the room or rooms containing the problem contaminant, the system can iteratively sample air from a progressively smaller subset of the set of rooms, such as a subset that is half of the size of the previously sampled set. In such a "divide and conquer" sampling approach, half of the remaining rooms in the ventilated environment are eliminated as potential sources of contamination with each iteration of sampling.

In the various embodiments of the invention discussed above, one or more controllers 50 associated with a given ventilation system can be implemented in numerous ways, such as with dedicated hardware, or using one or more processors that are programmed using microcode or software to perform the various functions of the controller as discussed above. In this respect, it should be appreciated that one implementation of the present invention comprises a computer readable medium (e.g., a computer memory, a floppy disk, a compact disk, a tape, etc.) encoded with a computer program that, when executed on one or more processors, performs at least some of the above-discussed functions of the present invention. The computer readable medium can be transportable, such that the program stored thereon can be loaded onto a computer system (e.g., including one or more processors) that is associated with the ventilation system so as to implement various aspects of the present invention discussed above. The term "computer program" is used herein in a generic sense to refer to any type of computer code (e.g., software or microcode) that can be employed to program one or more processors so as to implement the above-discussed aspects of the present invention.

From the foregoing, it should be readily appreciated that a wide variety of ventilation system and controller configurations are facilitated by various embodiments of the invention to provide for the recirculation of air in controlled ventilated environments.

Having thus described several illustrative embodiments of the invention, various alterations, modifications, and improvements will readily occur to those skilled in the art. Such alterations, modifications, and improvements are intended to be within the spirit and scope of the invention. Accordingly, the foregoing description is by way of example only, and is not intended as limiting. The invention is limited only as defined in the following claims and the equivalents thereto.

What is claimed is:

1. In a ventilated environment including at least a first room and a second room ventilated by a common source of supply air, the first room having drawn therefrom first return air that constitutes a first portion of air returned to the ventilated environment as at least some of the supply air, the second room having drawn therefrom second return air that constitutes a second portion of the air returned to the ventilated environment as at least some of the supply air, a method of controlling a level of at least one contaminant in the supply air, comprising an act of:

A) independently controlling at least one of a first flow of the first return air and a second flow of the second return air based at least on a contaminant level of the at least one contaminant in at least one of the first room and the second room.

2. The method of claim 1, wherein the act A) includes acts of:

B) determining a threshold value for the contaminant level of the at least one contaminant in at least one of the first room and the second room; and C) independently controlling at least one of the first flow of the first return air and the second flow of the second return air based at least on a difference between the threshold value and the contaminant level of the at least one contaminant.

3. The method of claim 2, wherein the act B) includes an act of:

determining the threshold value for the contaminant level of the at least one contaminant based at least on a dilution ratio of at least one of the first flow of the first return air and the second flow of the second return air to an uncontaminated air flow associated with the supply air provided to the ventilated environment.

4. The method of claim 3, wherein the supply air includes at least fresh air, the first return air, and the second return air, and wherein the uncontaminated air flow represents at least a flow of the fresh air.

5. The method of claim 4, wherein the ventilated environment includes a plurality of rooms, wherein the supply air includes return air from at least some of the plurality of rooms, and wherein the uncontaminated air flow represents at least the flow of the fresh air and a flow of initially uncontaminated return air from at least some of the plurality of rooms.

6. The method of claim 2, wherein the act C) includes an act of: independently controlling at least one of the first flow of the first return air and the second flow of the second return air so as to independently satisfy a minimum ventilation requirement and a thermal load requirement for at least one of the first room and the second room if the contaminant level of the at least one contaminant is less than the threshold value.

7. The method of claim 2, wherein the act C) includes an act of:

reducing at least one of the first flow of the first return air and the second flow of the second return air if the contaminant level of the at least one contaminant exceeds the threshold value.

8. The method of claim 2, wherein the act C) includes an act of:

reducing a flow of the supply air to at least one of the first room and the second room if the contaminant level of the at least one contaminant exceeds the threshold value.

9. The method of claim 2, wherein the act C) includes an act of:

increasing a flow of exhaust air that is drawn from at least one of the first room and the second room and not returned to the ventilated environment if the contaminant level of the at least one contaminant exceeds the threshold value.

10. The method of claim 9, wherein the act C) further includes an act of:

maintaining unchanged a flow of the supply air to at least one of the first room and the second room if the contaminant level of the at least one contaminant exceeds the threshold value.

11. The method of claim 9, wherein the act C) further includes an act of:

reducing at least one of the first flow of the first return air and the second flow of the second return air if the contaminant level of the at least one contaminant exceeds the threshold value.

12. The method of claim 1, further including acts of:

B) sensing at least one of the first return air and the second return air to determine the contaminant level of the at least one contaminant; and C) filtering at least one of the first return air and the second return air.

13. The method of claim 12, wherein:

the act C) precedes the act B); and the act B) includes an act of sensing at least one of filtered first return air and filtered second return air.

14. The method of claim 12, wherein the act C) includes an act of selectively filtering at least one of the first return air and the second return air based on the contaminant level.

15. The method of claim 1, wherein the ventilated environment includes at least one first sensor to sense only the first return air and at least one second sensor to sense only the second return air, wherein the method further includes acts of:

sensing the first return air to determine a first contaminant level of the at least one contaminant in the first room; and sensing the second return air to determine a second contaminant level of the at least one contaminant in the second room, and wherein the act A) includes acts of:

controlling the first flow of the first return air based at least on the first contaminant level; and controlling the second flow of the second return air based at least on the second contaminant level.

16. The method of claim 1, wherein the ventilated environment includes at least one sensor to sense at least the first return air and the second return air, and wherein the method further includes an act of:

B) sensing both of the first return air and the second return air at a single location using the at least one sensor to determine the contaminant level of the at least one contaminant.

17. The method of claim 16, wherein:

the act B) includes an act of sensing the first return air and the second return air in a multiplexed manner to determine a first contaminant level of the at least one contaminant in the first room and a second contaminant level of the at least one contaminant in the second room; and the act A) includes acts of:

controlling the first flow of the first return air based at least on the first contaminant level; and controlling the second flow of the second return air based at least on the second contaminant level.

18. A computer readable medium encoded with at least one program for execution on at least one processor associated with a ventilated environment including at least a first room and a second room ventilated by a common source of supply air, the first room having drawn therefrom first return air that constitutes a first portion of air returned to the ventilated environment as at least some of the supply air, the second room having drawn therefrom second return air that constitutes a second portion of the air returned to the ventilated environment as at least some of the supply air, the at least one program, when executed on the at least one processor, performing a method of controlling a level of at least one contaminant in the supply air, the method comprising an act of:

A) independently controlling at least one of a first flow of the first return air and a second flow of the second return air based at least on a contaminant level of the at least one contaminant in at least one of the first room and the second room.

19. A controller to control a level of at least one contaminant in a common source of supply air for a ventilated environment that includes at least a first room and a second room supplied by the supply air, the first room having drawn therefrom first return air that constitutes a first portion of air returned to the ventilated environment as at least some of the supply air, the second room having drawn therefrom second return air that constitutes a second portion of the air returned to the ventilated environment as at least some of the supply air, the controller independently controlling at least one of a first flow of the first return air and a second flow of the second return air based at least on a contaminant level of the at least one contaminant in at least one of the first room and the second room.

20. The controller of claim 19, wherein the controller includes at least a first input to receive a threshold value for the contaminant level of the at least one contaminant in at least one of the first room and the second room, wherein the controller includes a second input to receive the contaminant level, and wherein the controller independently controls at least one of the first flow of the first return air and the second flow of the second return air based at least on a difference between the threshold value and the contaminant level of the at least one contaminant.

21. The controller of claim 20, wherein the threshold value received at the first input is based at least on a dilution ratio of at least one of the first flow of the first return air and the second flow of the second return air to an uncontaminated air flow associated with the supply air provided to the ventilated environment.

22. The controller of claim 20, wherein the controller independently controls at least one of the first flow of the first return air and the second flow of the second return air so as to independently satisfy a minimum ventilation requirement and a thermal load requirement for at least one of the first room and the second room if the contaminant level of the at least one contaminant is less than the threshold value.

23. The controller of claim 20, wherein the controller reduces at least one of the first flow of the first return air and the second flow of the second return air if the contaminant level of the at least one contaminant exceeds the threshold value.

24. The controller of claim 20, wherein the controller reduces a flow of the supply air to at least one of the first room and the second room if the contaminant level of the at least one contaminant exceeds the threshold value.

25. The controller of claim 20, wherein the controller increases a flow of exhaust air that is drawn from at least one of the first room and the second room and not returned to the ventilated environment if the contaminant level of the at least one contaminant exceeds the threshold value.

26. The controller of claim 25, wherein the controller maintains unchanged a flow of the supply air to at least one of the first room and the second room if the contaminant level of the at least one contaminant exceeds the threshold value.

27. The controller of claim 25, wherein the controller reduces at least one of the first flow of the first return air and the second flow of the second return air if the contaminant level of the at least one contaminant exceeds the threshold value.

28. In a ventilated environment including at least a first room and a second room ventilated by a common source of supply air, the first room having drawn therefrom first return air that constitutes a first portion of air returned to the ventilated environment as at least some of the supply air, the second room having drawn therefrom second return air that constitutes a second portion of the air returned to the ventilated environment as at least some of the supply air, a method of determining a threshold value for a contaminant level of at least one contaminant in at least one of the first room and the second room, comprising acts of:

determining a dilution ratio of at least one of the first flow of the first return air and the second flow of the second return air to an uncontaminated air flow associated with the supply air provided to the ventilated environment; and determining the threshold value for the contaminant level of the at least one contaminant based at least on the dilution ratio.

29. The method of claim 28, wherein the supply air includes at least fresh air, the first return air, and the second return air, and wherein the uncontaminated air flow represents at least a flow of the fresh air.

30. The method of claim 29, wherein the ventilated environment includes a plurality of rooms, wherein the supply air includes return air from at least some of the plurality of rooms, and wherein the uncontaminated air flow represents at least the flow of the fresh air and a flow of initially uncontaminated return air from at least some of the plurality of rooms.

31. In a ventilated environment including at least a first room and a second room, the first and second rooms being ventilated by a common source of supply air, a method for ventilating at least the first and second rooms, comprising an act of:

controlling a first flow of first return air drawn only from the first room based at least in part on a first air quality in at least the first room, the first return air constituting at least a first portion of the supply air supplied to at least the first and second rooms.

32. The method of claim 31, wherein the act of controlling a first flow of first return air further includes an act of controlling a second flow of second return air drawn only from the second room based at least in part on a second air quality in at least the second room, the second return air constituting at least a second portion of the supply air supplied to at least the first and second rooms.

33. The method of claim 31, wherein the act of controlling a second flow of second return air includes an act of independently controlling the second flow of the second return air such that the second flow of the second return air is controlled substantially independently of the first flow of the first return air.

34. A computer readable medium encoded with at least one program for execution on at least one processor associated with a ventilated environment including at least a first room and a second room, the first and second rooms being ventilated by a common source of supply air, the at least one program, when executed on the at least one processor, performing a method for ventilating at least the first and second rooms, the method comprising an act of:

controlling a first flow of first return air drawn only from the first room based at least in part on a first air quality in at least the first room, the first return air constituting at least a first portion of the supply air supplied to at least the first and second rooms.

35. The computer readable medium of claim 34, wherein the act of controlling a first flow of first return air further includes an act of controlling a second flow of second return air drawn only from the second room based at least in part on a second air quality in at least the second room, the second return air constituting at least a second portion of the supply air supplied to at least the first and second rooms.

36. The computer readable medium of claim 35, wherein the act of controlling a second flow of second return air includes an act of independently controlling the second flow of the second return air such that the second flow of the second return air is controlled substantially independently of the first flow of the first return air.

37. In a ventilated environment including at least a first room and a second room, the first and second rooms being ventilated by a common source of supply air, a ventilation system comprising:

a first return air flow device to control a first flow of first return air drawn only from the first room based at least in part on a first air quality in at least the first room, the first return air constituting at least a first portion of the supply air supplied to at least the first and second rooms.

38. The ventilation system of claim 37, further comprising:

a second return air flow device to control a second flow of second return air drawn only from the second room based at least in part on a second air quality in at least the second room, the second return air constituting at least a second portion of the supply air supplied to at least the first and second rooms.

39. The ventilation system of claim 38, further comprising a controller to control the first return air flow device and the second return air flow device such that the second flow of second return air is controlled substantially independently of the first flow of first return air.

40. In a ventilated environment including at least a first room and a second room ventilated by a common source of supply air, the first room having drawn therefrom first return air that may constitute a first portion of air returned to the ventilated environment as at least some of the supply air, the second room having drawn therefrom second return air that may constitute a second portion of the air returned to the ventilated environment as at least some of the supply air, a method of controlling a level of at least one contaminant in at least one of the first room and the second room, comprising an act of:

A) independently controlling a flow of at least one of a first return air and a second return air based on a contaminant level such that all of the return air drawn from the at least one of the first room and the second room containing the at least one contaminant is exhausted from the ventilated environment and none of the return air drawn from the at least one room is returned to the ventilated environment as at least some of the common source of supply air.

41. The method of claim 40, wherein the ventilated environment includes at least one sensor to sense the at least one contaminant in at least one of the first return air and the second return air.

42. The method of claim 40, wherein the act of independently controlling a flow of at least one of a first return air and a second return air flow comprises operating a return airflow device so as to prohibit the flow of return air drawn from the at least one of the first room and the second room containing the at least one contaminant.

* * * * *